US008566184B1

(12) United States Patent
Paluck et al.

(10) Patent No.: US 8,566,184 B1
(45) Date of Patent: Oct. 22, 2013

(54) METHOD AND TOOL FOR PORTFOLIO MONITORING, REBALANCING AND REPORTING

(75) Inventors: Eric Joseph Paluck, Maple Grove, MN (US); Julia Ann Newberry, Minneapolis, MN (US); Steven Robert Williamson, Plymouth, MN (US); Shawn Christian Mize, Richfield, MN (US); Teri Lynn Reitan Gemilere, St Louis Park, MN (US); Beth Michelle Vanney, Wausau, WI (US)

(73) Assignee: Ameriprise Financial, Inc., Minneapolis, MN (US)

( * ) Notice: Subject to any disclaimer, the term of this patent is extended or adjusted under 35 U.S.C. 154(b) by 1916 days.

(21) Appl. No.: 10/618,014

(22) Filed: Jul. 11, 2003

Related U.S. Application Data

(60) Provisional application No. 60/436,355, filed on Dec. 23, 2002.

(51) Int. Cl.
*G07F 19/00* (2006.01)
*G06Q 40/00* (2012.01)

(52) U.S. Cl.
USPC .......................................... 705/30; 705/36 R

(58) Field of Classification Search
USPC ........................................ 705/30, 36 T, 36 R
See application file for complete search history.

(56) References Cited

U.S. PATENT DOCUMENTS

| | | | | |
|---|---|---|---|---|
| 5,101,353 A | * | 3/1992 | Lupien et al. | 705/37 |
| 5,214,579 A | * | 5/1993 | Wolfberg et al. | 705/36 R |
| 5,819,263 A | * | 10/1998 | Bromley et al. | 1/1 |
| 6,928,418 B2 | * | 8/2005 | Michaud et al. | 705/36 R |
| 7,149,713 B2 | * | 12/2006 | Bove et al. | 705/36 R |
| 7,165,044 B1 | * | 1/2007 | Chaffee | 705/37 |
| 7,177,831 B1 | * | 2/2007 | O'Shaughnessy et al. | 705/36 R |
| 7,197,484 B1 | * | 3/2007 | Yuyama | 705/50 |
| 7,321,871 B2 | * | 1/2008 | Scott et al. | 705/36 R |
| 2002/0138386 A1 | * | 9/2002 | Maggioncalda et al. | 705/36 |
| 2002/0143680 A1 | * | 10/2002 | Walters et al. | 705/36 |
| 2002/0147671 A1 | * | 10/2002 | Sloan et al. | 705/36 |
| 2007/0130043 A1 | * | 6/2007 | O'Shaughnessy et al. | 705/36 R |

OTHER PUBLICATIONS

Kevles, Barbara, "Using Asset Allocation Software", Nov. 1993, Journal of Accountancy, 176, 5, Accounting & Tax Periodicals, pp. 83-87.*

* cited by examiner

*Primary Examiner* — Charles Kyle
*Assistant Examiner* — Irene Kang
(74) *Attorney, Agent, or Firm* — Snell & Wilmer L.L.P.

(57) ABSTRACT

There is provided a rebalancing tool and method that enables an advisor to monitor client account performance against a client account model, receive alerts out-of-balance client accounts, and preview rebalancing hypothetical results. The rebalancing tool enables the advisor to perform the steps of creating a client model via a web interface and compare the client account against the client model at the asset class level. The rebalancing tool can display out-of-balance client account alerts and out-of-balance client accounts on a rebalancing tool page, and enable a user to test a rebalancing hypothetical that includes modifications to the percentage asset allocation or percentage tolerance threshold at the asset class level, and planned trades to the client account. The rebalancing tools enables a user to prepare rebalancing hypothetical results that may then be presented to the client for approval. The rebalancing hypothetical results can include calculated results for risk grade, diversification benefit, Gain/Loss.

22 Claims, 15 Drawing Sheets

Account Rebalancing

|  | Current | Planned |
|---|---|---|
| Risk Grade | 90 | 60 |
| Diversification Benefit | 49 | 52 |
| Gain/Loss |  | $7,198 |
| To be Rebalanced |  | ($6.07) |

Update Risk & Diversification Benefit

WARNING: THIS ACCOUNT HAS OPEN ORDERS PENDING!
WARNING: CASH IS EXCLUDED FROM ANALYSIS!

Percentage | Value

Advisor: J H Christopher R12345
Client: Gordon Gekko
Account: 47436348

|  | Model | Planned | Curr | Diff |
|---|---|---|---|---|
| Cash | 5% | 16% | 11% | 11% |
| Cash Equivalents | 5% | 16% | 11% | 11% |
| Fixed | 40% | 31% | -9% | -9% |
| High Yield Fixed | 10% | 12% | 2% | 2% |
| Long/Intermediate | 30% | 19% | -11% | -11% |
| Stock | 55% | 56% | -2% | -2% |
| Large Cap Stock | 35% | 43% | 35% | 35% |
| Small/Mid Cap Stock | 10% | 17% | 7% | 7% |
| International Stock | 10% | 12% | 2% | 2% |
| Other | 0% | -2% | -2% | -2% |
| Account | 100% | 116% | 97% |  |

Modify Model | All Accounts | PRINT FOR CLIENT | PRINT TRADE INSTRUCTION

| Current Qty | Symbol or CUSIP | Holdings | Investment Style | Price | Basis | Gain/Loss | Market Value | Value | % Account | Original Target |  |
|---|---|---|---|---|---|---|---|---|---|---|---|
| Total |  |  |  |  | $43,350 | $21,126 | $51,477 |  |  |  |  |
| Cash Equivalents |  |  | Estimated Cash required to cover fees | $125 |  |  |  |  |  |  |  |
| 8000 | IDSXX | AXP Cash Management |  | $1.00 | $8,000 | $0 | $8,000 | $7,890 | 15% | 0% | 0 |
|  |  | AEIMMA [Sweep] |  | $1.00 | $2,500 | $0 | $2,500 | $2,500 | 5% |  |  |
|  |  | Margined Holdings |  |  | ($2,000) | $0 | ($2,000) | ($2,000) | -4% |  |  |
| High Yield Fixed |  |  |  |  |  |  |  |  |  |  |  |
| 600 | INEAX | AXP Extra Income Fund | HYLD | $2.59 | $1,500 | $54 | $1,554 | $8,554 | 12% | 3% | 26 |
| Long/Intermediate |  |  |  |  |  |  |  |  |  |  |  |
| 800 | INBNX | AXP Bond Fund | LTFX | $4.76 | $3,000 | $808 | $3,808 | $7,616 | 14% | 5% | 16 |
| 500 | AXFCX | AXP Federal Income Fund | INTMBD | $4.86 | $2,500 | ($70) | $2,430 | $2,430 | 5% | 2% | 10 |
| Large Cap Stock |  |  |  |  |  |  |  |  |  |  |  |
| 200 | AXP | Amer Express | LCG | $37.14 | $7,000 | $428 | $7,428 | $7,428 | 14% | 10% | 164 |
| 150 | INIDX | AXP Growth Fund | LCG | $22.98 | $3,000 | $447 | $3,447 | $3,447 | 7% | 5% | 85 |
| 120 | AVFBX | AXP Partners Value Fund | LCV | $4.24 | $500 | $9 | $509 | $509 | 1% | 6% | 80 |
| 300 | IBM | Intl Bus. Machines | LCV | $74.65 | $10,000 | $12,395 | $22,395 | $11,198 | 21% | 20% | 184 |
| Tax Lots |  | Purchase Date |  |  |  |  |  |  |  |  |  |
| 150 |  | mm/dd/yy |  | $74.65 | $4,000 | $7,198 | $11,198 | $0 | 0% |  |  |
| 150 |  | mm/dd/yy |  | $74.65 | $6,000 | $5,198 | $11,198 | $11,198 | 21% |  |  |
| Small/Mid Cap Stock |  |  |  |  |  |  |  |  |  |  |  |
| 200 | ANLY | Analysts International | SMCAP | $3.92 | $2,350 | ($1,566) | $784 | $784 | 1% | 69% | 315 |
| Tax Lots |  | Purchase Date |  |  |  |  |  |  |  |  |  |
| 100 |  | mm/dd/yy |  | $3.92 | $350 | $42 | $392 | $392 | 1% |  |  |
| 100 |  | mm/dd/yy |  | $3.92 | $2,000 | ($1,608) | $392 | $392 | 1% |  |  |
| 350 | HRL | Hormel Foods | SMCAP | $23.34 | $8,000 | $169 | $8,169 | $8,169 | 15% | 15% | 117 |
| International Stock |  |  |  |  |  |  |  |  |  |  |  |
| 400 | AXOAX | AXP Partners International Aggressive Growth | INTL | $5.58 | $2,000 | $232 | $2,232 | $2,232 | 4% | 23% | 37 |
| 250 | APIAX | AXP Partners International Select Value | INTL | $5.72 | $1,000 | $430 | $1,430 | $3,930 | 7% | 34% | 44 |
| Unclassified |  |  |  |  |  |  |  |  |  |  |  |
|  | XXXXX | Anything not classified |  |  |  |  | Asset Class: -Select- |  |  |  |  |
| (100) | XYZ | XYZ stock (to show short position) |  | $12.00 | ($1,000) | ($200) | ($1,200) | ($1,200) | -2% |  |  |

Unclassified holdings must be classified before rebalancing!
To Add a holding, key in a Symbol or CUSIP

FIG. 11

METHOD AND TOOL FOR PORTFOLIO MONITORING, REBALANCING AND REPORTING

CROSS REFERENCE TO RELATED APPLICATIONS

The present application claims the benefit of U.S. Provisional Application Ser. No. 60/436,355, filed Dec. 23, 2002 and titled "System and Method for a Financial Rebalancing Tool".

TECHNICAL FIELD

The present subject matter relates generally to the field of investments and financial services involving securities. More particularly, the present subject matter relates to computerized or web-based methods and systems for analyzing, monitoring, rebalancing a client investment portfolio, and for enabling a financial advisor to determine whether to recommend to a client the rebalancing of their investment portfolio.

BACKGROUND

Rebalancing is often carried out for client accounts or investment portfolios of the type offered by financial services providers such as American Express® and its competitors. One example of such a financial service is the Strategic Portfolio Services (SPS) Advantage or the Wealth Management Service offered by American Express®. Methods and tools for monitoring and rebalancing investment portfolios to maintain desired asset allocation are well known. Rebalancing typically involves adjusting investments to maintain desired asset allocation that adheres to a client's investment strategy. Also, rebalancing is carried out to account for the gains and loses experienced by securities or positions in the investment portfolio from time to time. Rebalancing allows a financial advisor, financial services provider or a client the opportunity to review and modify a client's account on an ongoing basis for improved stability, value and performance of the client's investment portfolio.

Existing methods typically require a client's initial asset allocation instructions which can include the funds, positions or securities the client wishes to invest in and the percentages of investment capital that are to be allocated to each fund or position, among other information. The asset allocation will vary from client to client depending on their tolerance for or aversion to risk, amount of capital invested, desire to limit exposure in certain industry sectors or fields, types or class of assets held, etc. The client can later authorize rebalancing by request or by manually completing rebalancing forms and submitting the forms to the financial advisor or financial services provider to carryout the selected choices and asset allocations, along with instructions on how frequently the portfolio is to be rebalanced back to the client's original asset allocation.

Existing rebalancing methods and tools can rebalance a portfolio automatically based on prior client instructions or on schedule determined by the client. The client can authorize automatic rebalancing at regular intervals, e.g., three months, six, twelve, eighteen, twenty four months, or some other client selected interval. The automatic rebalancing continues per the client's prior instructions or until the client modifies the rebalancing instructions. Typically, the client's portfolio is rebalanced to adhere to the client's original asset allocation.

In order to carry out rebalancing of investment portfolios, existing rebalancing methods often require manual retrieval and review of data and information for each of the client's investments, positions or committee on uniform securities identification procedures (CUSIP) designated securities, as well as the client's original asset allocation information to determine what rebalancing needs to be carried out. This can be a time consuming task for the financial advisor who must pull and collect this data and information. Once rebalancing is completed, the client will be informed of changes made to the account.

Automatic rebalancing tools and methods can be a rigid and inflexible way to rebalance investment portfolios. It is not always in the best interest of the client to automatically rebalance the account back to the original asset allocation. In some circumstances, it may be advisable to first conduct a market analysis and/or conduct a review of the client's financial condition and investment objectives and goals which may have changed since the client selected the original asset allocation. Existing automatic rebalancing tools and methods limit additional inquiries prior to automatically rebalancing of the client account.

Some rebalancing methods and tools are manual and require that a client specifically submit a rebalancing request and authorization each time rebalancing is desired. These rebalancing tools or methods could allow a client to submit new or revised asset allocation instructions. In such a case, specific authorization from the client to rebalance may occur on an infrequent or irregular basis or none at'all if the client is occupied and/or forgets to authorize and request rebalancing of the account. Further, the client may not have access to current market information or may not have time to review market information and thus may not be able to determine the optimum time for requesting a rebalance.

Further, existing rebalancing methods and tools typically carryout zero-sum rebalancing of the client portfolio. Zero-sum rebalancing typically refers to a portfolio rebalancing where the assets are re-allocated within the client's current positions or investments and the net value of investments remain the same. For example, if a client has $10,000 in investment A and $30,000 in investment B and the asset allocation or split selected by the client is 50% invested each in investments A and B, then the zero-sum rebalance would shift $10,000 from investment B to investment A, and the account net value would remain $40,000. It may not always be in the best interest of the client to reallocate assets between investments A and B. In some circumstance, it may be advisable and prudent to a particular client situation to shift the $10,000 to a third investment C rather than to investment A as required by the zero-sum rebalancing method. Thus, the zero-sum rebalancing tools and methods can be rigid and inflexible and limit the client's ability to rebalance the investment portfolio in the most advantageous manner for the client.

Additionally, existing rebalancing methods and tools have limited capabilities and features for financial advisors to provide additional assistance or financial services which would assist the client to determine ahead of time the benefits of rebalancing. Also, existing rebalancing methods and tools generally can not generate rebalancing hypothetical result reports for use by a financial advisor and client in determining whether or not rebalancing is appropriate.

There is thus a need for a rebalancing tool and method for monitoring a client account or investment portfolio and for selectively rebalancing a client account to meet a client model asset allocations. There is also a need for a rebalancing tool and method that can automatically monitor a client account and generate alerts when the client account is out-of-balance, and to enable a financial advisor to conduct rebalancing hypotheticals to determine whether to recommend that a client account be rebalanced.

SUMMARY

There is provided a rebalancing tool and method for investment portfolio monitoring, rebalancing, and reporting for ongoing maintenance and management of the financial advisor's client portfolios. The rebalancing method enables the financial advisor to monitor and analyze the performance of client investment portfolios to determine whether to recommend rebalancing of the client's investment portfolio. The rebalancing method enables a financial advisor to receive alerts of out-of-balance client portfolios, analyze the performance of client portfolios against a corresponding client account asset allocation model, and to preview results of hypothetical trades or transactions that may then be recommended to rebalance the client's portfolio to meet the asset allocation model.

In one example, there is provided a rebalancing tool for monitoring and rebalancing a client account having computer-executable instructions that enable a user to perform the steps of creating a client asset allocation model in the rebalancing application via a web interface and comparing the client account against the client asset allocation model at the asset class level. The rebalancing tool can generate and display out-of-balance client account alerts and out-of-balance client accounts on a rebalancing tool page, where the generated alarm indicates that the client account is out-of-balance with the client asset allocation model at the asset class level. The rebalancing tool also enables a user to test at least one rebalancing hypothetical to rebalance the out-of-balance client account. The rebalancing hypothetical can include modifications to the client asset allocation model and planned trades for the client account. The modification to the client asset allocation model can include changes to percentage asset allocation or changes to the tolerance threshold of one or more asset classes. The rebalancing tools also enables a user to prepare rebalancing hypothetical results for communication of the results the client. The rebalancing hypothetical results can include calculated results for risk impact, risk grade, diversification benefit, Gain/Loss and a planned trade report or a trade instruction worksheet. After discussion and review with an advisor, the client can authorize the rebalancing of the client account by modifying the client asset allocation model or executing planned hypothetical trades.

It is an objective to provide a rebalancing tool that provides alerting functionality with adjustable alarm thresholds, compares actual asset holdings against a client asset allocation model and generates alarms when a client account is out-of-balance.

It is an objective to provide a rebalancing tool to provide enhanced online rebalancing functionality to assist financial advisors to better manage their client's investment portfolios.

It is an objective to provide a rebalancing tool can provide resultant risk, diversification benefit and gain/loss impacts to planned or hypothetical rebalancing scenarios.

It is an objective to provide a rebalancing tool able to produce a client-ready report and a trade worksheet.

It is still another objective to provide a rebalancing method for enabling a financial advisor to recommend client account or portfolio rebalancing actions and for determining the affect or impact of rebalancing hypotheticals.

Additional objects, advantages and novel features of the examples will be set forth in part in the description which follows, and in part will become apparent to those of ordinary skill in the art upon examination of the following and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements. The description may be better understood when read in connection with the accompanying drawings, of which:

FIG. 11 illustrates an example of a client account rebalancing screen;

DETAILED DESCRIPTION

Figure 1:
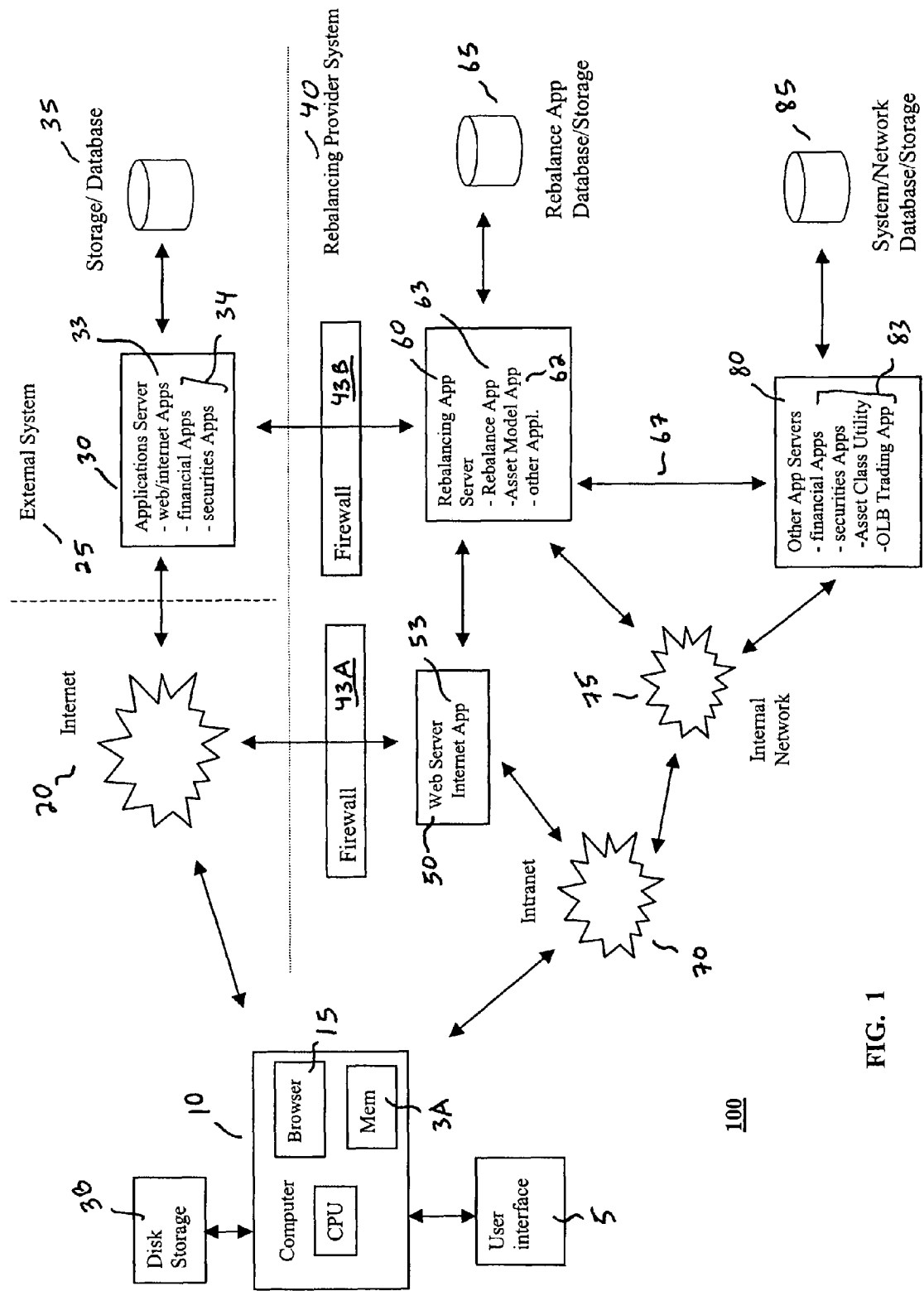
FIG. 1 illustrates a schematic diagram of a system where a rebalancing tool can be implemented.

FIG. 1 shows a schematic diagram of one example of a computerized system 100 where a rebalancing tool or application 63 may be implement to monitor and rebalance a client account. The system 100 can be a computerized web-based system using stand alone computers and/or a networked computerized machine running and executing software applications and computer programs. The system 100 can include a user computer 10 that can be used by an authorized user, such as a financial advisor, to access a rebalancing tool application 63. The user computer 10 can include applications that enable the user to access the rebalancing tool application 63, for example a browser application 15. The user or desktop computer 10, can have a computer processor 7 and internal memory 3A. The user or desktop computer 10 can be a typical computer, such as a desktop computer or lap top computer, as is well known to those of skill in the art, and may also include external memory storage or disk storage 3B and a user input/output interface 5. The computer processor 7 can be a microprocessor that can execute software code or programs to implement instructions and processes such as the process illustrated and discussed with respect to FIGS. 2, 3, 4 and 15. The user interface 5 can include devices such as a typical keyboard, a mouse, a printer and a display monitor such that the user can input appropriate commands and information as well as view and retrieve desired information via the computer 10. Those of skill in the art will readily recognize, that although one user computer 10 is shown, there can be multiple computers that enable and permit authorized access to the rebalancing tool application 63. FIG. 1 also shows that a user, via the computer 10, can communicate with and use the rebalancing tool application 63, via a publicly accessible interconnected network (internet) 20 or via an internal organization network (intranet) 70 where the rebalancing tool application 63 resides.

FIG. 1 also illustrates that the rebalancing software application or tool 63 can run on a dedicated rebalancing application server or computer 60. The rebalancing server 60 can execute the rebalalancing application 63 along with other miscellaneous or related applications. The rebalancing application 63, when executing, can access and retrieve various types of data and information related to a client portfolio or account, e.g., client identification information, position or securities information, asset allocation information, etc. The rebalancing tool application 63 may also generate data and information that will be stored. Further, the rebalancing application can retrieve, send and store data and information both in the internal computer system or network 40 where it resides and in an external networks 20 and 25 and severs 30.

The rebalancing server 60 can be connected to a server or computer 30 in an external computing system 25 directly via a communications link to bi-directionally exchange information as required by the rebalancing application 63. The rebalancing server 60 can additionally or alternatively be connected or communicatively linked to the external server or computer 30 via the internet to bi-directionally exchange information. In this case, web server applications 53 and 33 are used to appropriately set up a communications link via the internet 20 and thereby enable secure exchange of information between the rebalancing application 63 and the relevant software application 34 in the external network 25. Additionally, FIG. 1 illustrates that a firewall 43A and 43B may be used to provide protection between the connected systems and computers. As is well know to those of skill in the art, a firewall can consist of hardware, software, filters and/or gateways, and is intended to protect a network, system, data and information by controlling which information is allowed to enter a system or to prevent unauthorized user from accessing a network.

Similarly, the rebalancing server 60 can be connected internally to another server or computer 80 via a direct communications link 67 or an internal network 75 to bi-directionally exchange information as required by the rebalancing application 63. The rebalancing server 60 can also or alternatively be connected or communicatively linked to another internal server or computer 80 via an intranet 70 to bi-directionally exchange information. In this case, the web server application 53 may used to appropriately set up a communications link via the intranet 70 and thereby enable exchange of information between the rebalancing tool application 63 and relevant software applications 83.

Additionally, any information and data required to be retrieved and/or stored by the rebalancing tool application 63 can be retrieved or stored from database applications or database storage locations 35, 65 and 85 accessible to the rebalancing application 63. The database applications and storage locations 35, 65 and 85 can be directly or indirectly connected to the rebalancing application server 60, for example as shown in FIG. 1. Database applications 35, 65, and 85 can be running on dedicated database servers or computers (not shown) or can be running on associated computers 30, 60 and 80. Database applications 35, 65 and 85 preferably comprise a database management system (DBMS) and database storage and database tables 65. Database applications and their capabilities, such as manipulation of data and information to generated desired reports, are well known to those of skill in the art. In one embodiment of the rebalancing tool application 63, the IBM Universal Database (UDB) is preferably used with the rebalancing application 63, however other database applications such as Microsoft (MS) Access 2000, Corel Paradox, Lotus Approach, or Sybase Database applications could be used as well among others. Further, other data storage mediums know to those of skill in the art may be used, including computer hard drives, floppy disks or disk drives, for the storage and retrieval of data and information by the rebalancing application 63.

Figure 2:
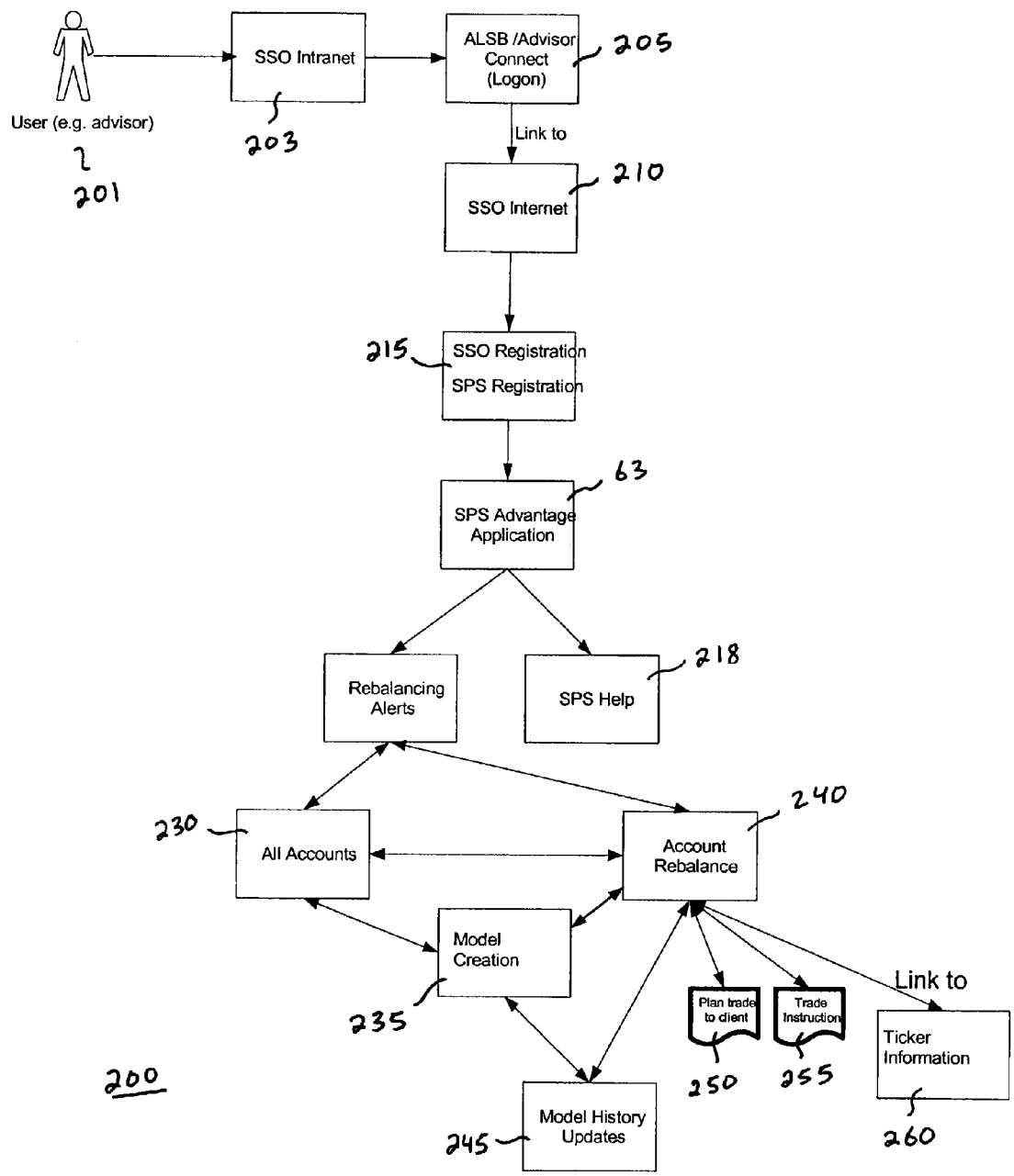
FIG. 2 illustrates an application flow of a rebalancing tool.
Figure 3:
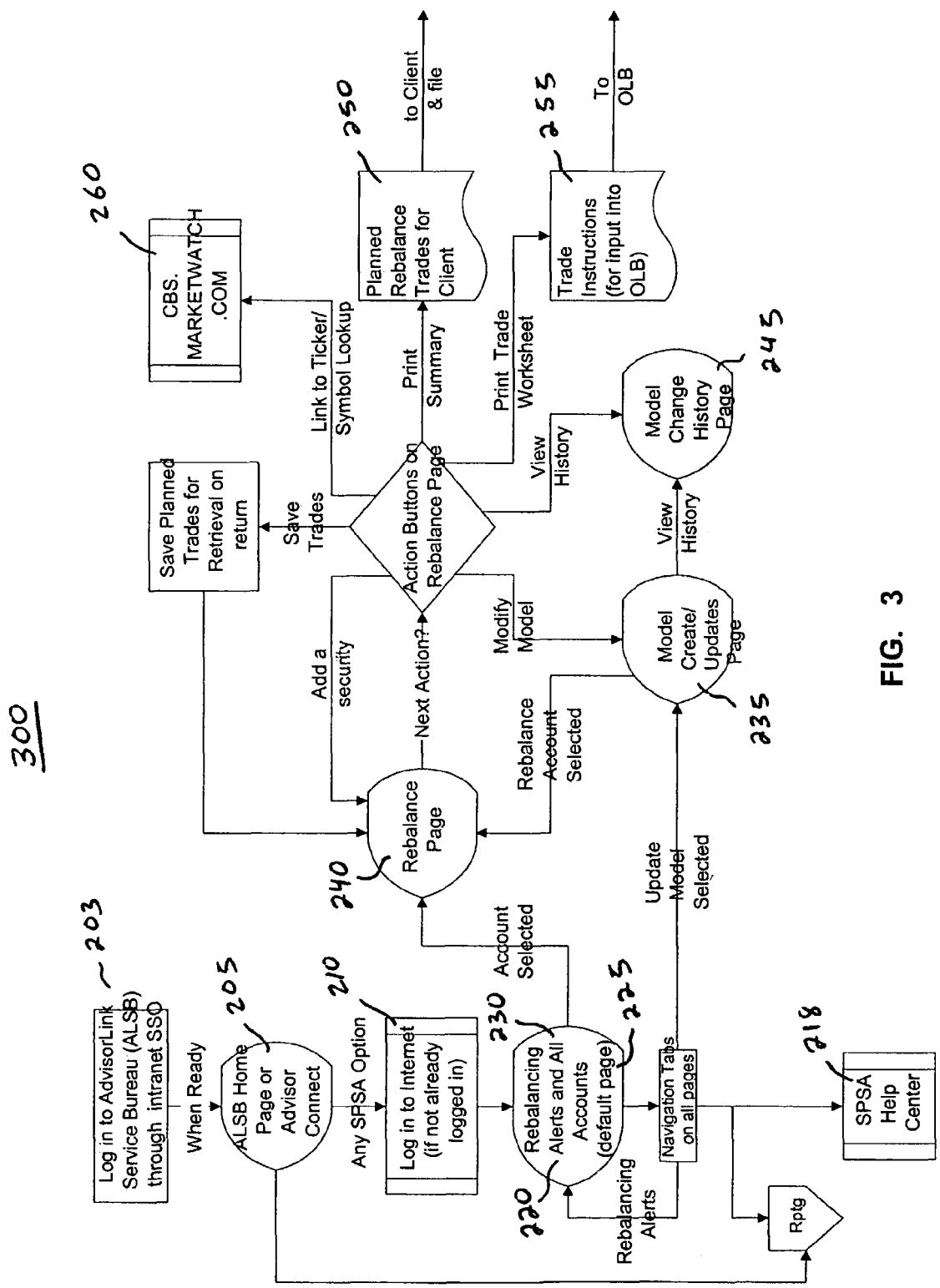
FIG. 3 illustrates another example of an application flow of the rebalancing tool.

FIGS. 2 and 3 illustrate an application flow 200 and 300 of the rebalancing and reporting tool application or tool 63 that can be implemented via execution of software code, computer-executable instructions or programmed instructions. The rebalancing tool application 63 enables a financial advisor or other authorized user 201 to create client asset allocation models for client accounts, monitor the performance of one or more client account against corresponding client asset allocation models, carryout rebalancing hypotheticals, analyze the rebalancing hypothetical results, formulate and report recommendations to a client account, and facilitates rebalancing, upon client approval, of the client accounts.

Access and use of the rebalancing tool 63 is preferably secure access. A financial advisor or authorized user 201 can securely access the rebalancing application 63 via a web interface such as a web browser 15 on the user's computer 10. The user 201 can access the rebalancing application 63 directly through an internet 20 connection or indirectly by first accessing another application interfaces 205. For example, a user 210 could first access an advisor link service bureau (ALSB) or Advisor Connect page 205 through an intranet web interface 203 and then access the rebalancing application 63 through an internet web interface 210 as shown in FIGS. 2 and 3.

Secure access to the rebalancing application 63 serves to protect client accounts and information and to ensure that only authorized users 201 are accessing and using the rebalancing application 63 and associated system or network applications. Secure access can be provided by computer and software applications intended for such purpose as is well known to those of skill in the art, e.g., a simple password and identification checking programs or utilities that check a user's 201 identification and password against a database file of authorized users and their corresponding passwords. One known application that could be used is a Single Sign On (SSO) application 210 which controls and monitors secure and authorized access to an application by authenticating login, password and user identification credential information inputted by a user 201.

Once a user 201 is properly authenticated, the user 201 can carry out actions on the rebalancing application 63 that can vary depending on the type or class of user 201. In one example, the rebalancing application 63 can permit various types of access levels or permissions that determine what actions a user 201 may perform. For example, a user could be authorized to access, update or access and/or update client account information. The level of access or permission may be garnered from the user's 201 input logon credential information, or may be input by the user 201 or may be retrieved from a user database once the user 201 has logged-in.

In one example, users 201 may be classified as, among others: advisors or planners authorized to sell financial products and services of a financial services company; as employees or independent contractors of the financial services company; as para-planners or other licensed assistants to the advisors; and client service representatives (CSR), sales consulting, field admin, admin, super-admin, field help desk, registered principal and compliance personnel. Further, users 201 may be categorized into user classes such as an advisor class, a para-planner class and a service and support class which can include, among others users, a client service representative (CSR), sales consulting, field admin, admin, super-admin, field help desk, registered principal and compliance personnel.

The permissions or authorizations given to user 201 may include: Advisor authorized to view and update only their own advisor client accounts; a Para-planner authorized to view and update only client accounts of an advisor they serve under; a field admin authorized to view only reporting for advisors and their client accounts; a registered principal authorized to view client accounts of advisors under them; and a CSR and sales consulting, field help desk and compliance personnel authorized to view all advisors and their client accounts. It will be apparent to those of skill in the art that other user types and classes may be used, as well as other permissions and authorizations Referring back to FIGS. 2 and 3, upon a successful log in, the user 201 can proceed to a home or default page 225. Those of skill in the art will readily recognize that the default page 225 and any screen or display page generated by the rebalancing tool 63 may contain information and content that can vary depending on the needs and requirements of a user 201 or organization. FIG. 3 shows that in one example, the default page 225 can comprise a page that can include information and content relating to All Accounts 230 and Rebalancing Alerts 220. FIG. 2 shows that the information relating to Rebalancing Alerts 220 and All Accounts 230 can also be separately displayed. In the case of FIG. 2, the default page 225 may include information and content relating to Rebalancing Alerts 220 with a link to a help page 218 for help information about the rebalancing application 63, its use and capabilities.

Figure 4:
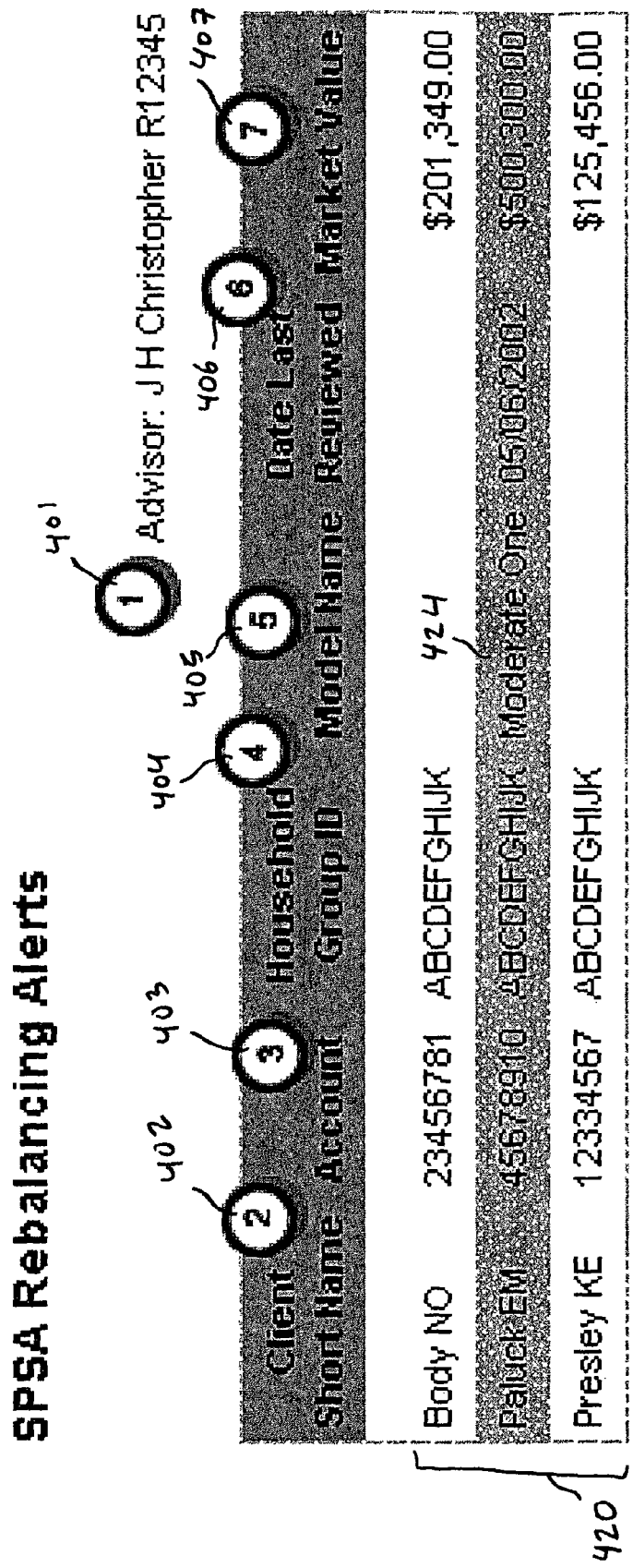
FIG. 4 illustrates an example of an out-of-balance alerts screen.

Referring to FIG. 2, the form and content of the default page 225 can comprise information relating to rebalancing alerts or alarms 220 for out-of-balance client accounts 420. FIG. 4 shows an example of an out-of-balance screen 400 comprising alerted or alarmed out-of-balance client accounts.

Out-of-Balance Alarms Screen

FIG. 4 displays client accounts 220 that have been determined by application 63, through client account monitoring and comparison with a corresponding asset allocation model, to be out-of-balance. In this example, the out-of-balance screen 400 can display: an advisor name and number field 401 which shows the advisor name and number 401 that the alerts apply to; a client name field 402 which displays the name of the account owner; an account number field 403 which displays the account number of the alerting account 420; a household group ID column 404 which displays the household group ID of the alerting account 220; a model name column 405 which displays the model name of the asset allocation model applied to the alerting account 420; a date last reviewed column 406 which shows the last date that a user 201, such as an advisor, reviewed the alerted client account 420; and a market value column 407 which shows the current market value of the entire client account or portfolio 420 which can, in one example, be calculated using holding quantities multiplied by holding price. Those of skill in the art will readily recognize that different or additional client account information for the out-of-balance client accounts 420 may also be included and displayed in the out-of-balance or rebalancing alerts screen 400

All Accounts Screen

Proceeding with the application flow of FIG. 2, the user 201 can proceed to an All Accounts page 230 or an Account Rebalance or Rebalancing page 240. In the case of FIG. 3, where the default page 225 comprises the All Account 230 and out-of-balance or Rebalancing Alerts screen 220, the user can proceed to the Account Rebalance or Rebalancing page 240.

Figure 5:
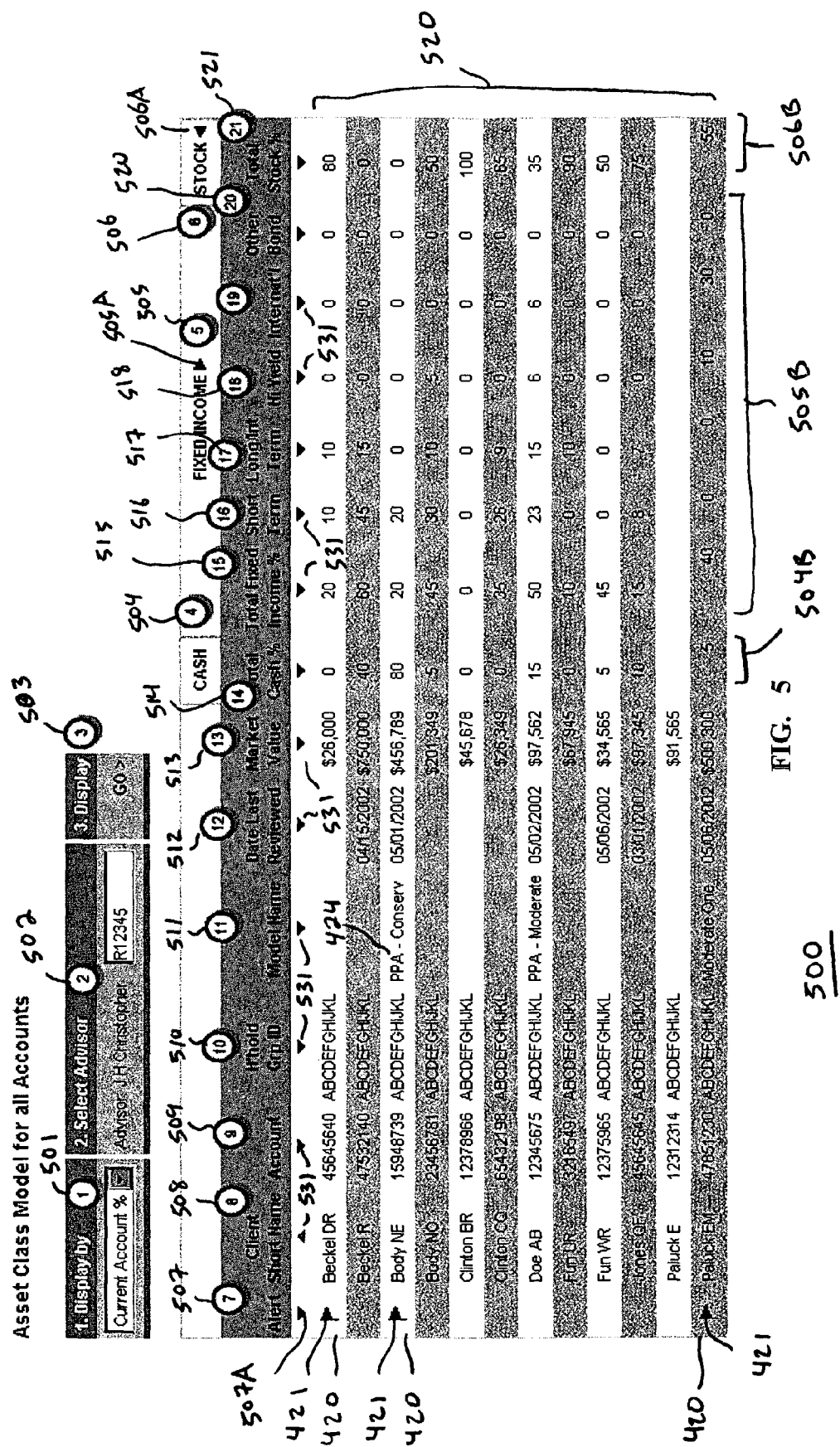
FIG. 5 illustrates an example of an all accounts screen.
Figure 6:
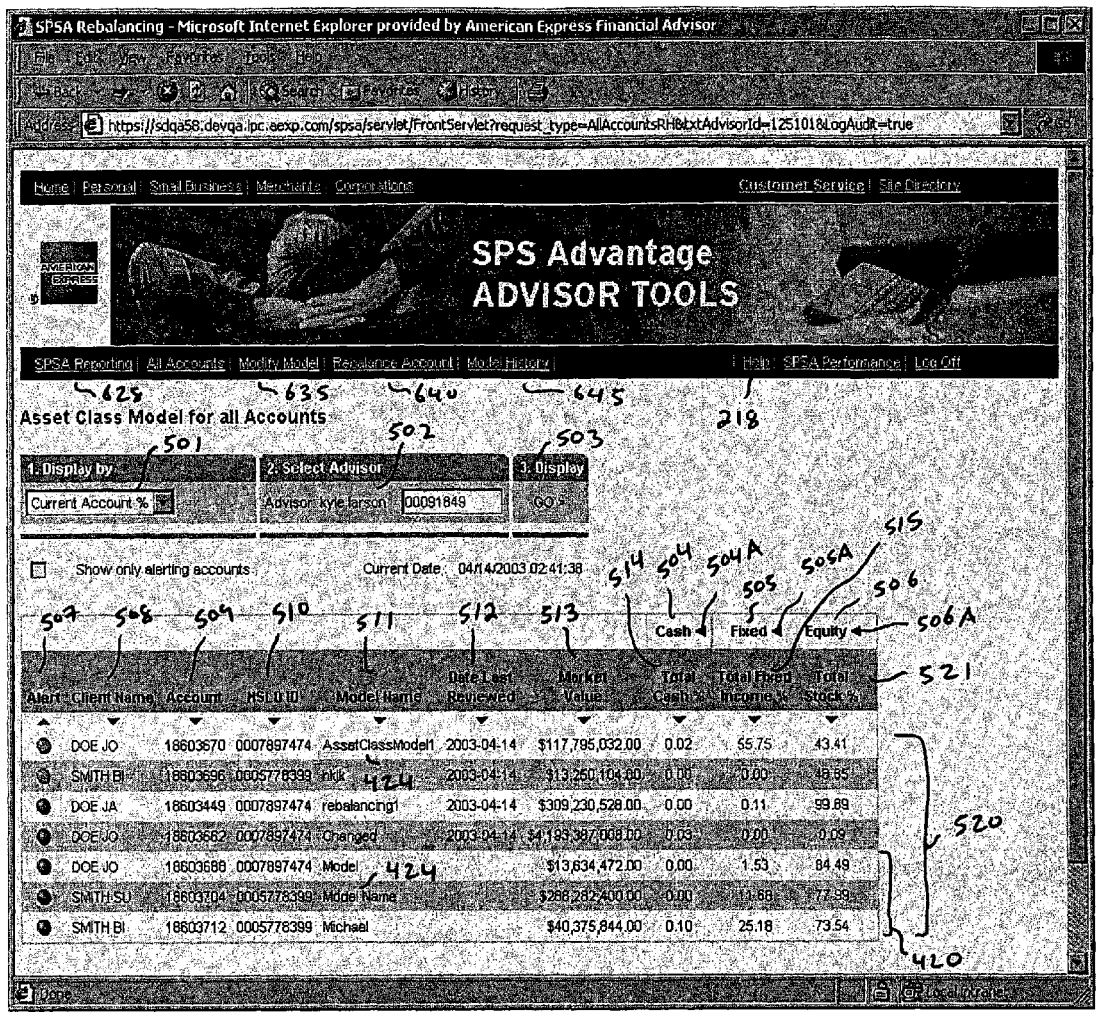
FIG. 6 illustrates another example of an all accounts screen.

If the user 201 proceeds to the All Accounts page 230, the user can be presented with All Accounts display screen 500 or 600, shown in FIGS. 5 and 6, that can comprise information relating to all client accounts 520 that the advisor 201 is responsible for and authorized to access, including out-of-balance client accounts 420. FIGS. 5 and 6 illustrate examples of an All Accounts screen 500 and 600 that may be provided in an All Accounts page 230. The All Accounts screen 500 and 600 can have a "Display by" drop down selection menu 501 which can control the data and information shown in the screen 500 and 600 and allows the user or advisor 201 to select the form they want to see allocation figures for the current account, e.g., in percent allocation, the model asset allocation, the model tolerance or the difference between the model and current account allocation. The All Accounts screen 500 and 600 can have a "Select Advisor" 502 that shows the advisor name and allows a user 201 to choose or input an advisor for which corresponding information will be displayed, and a Display trigger 502 that allows a user 201 to refresh the screen after changing the "Display by" drop down 501 or the "Select Advisor" 502 field.

The All Accounts screen 500 and 600 can also display an Alert or Alarms column 507 that can indicate that a client account or portfolio 420 is out-of-balance. The Alert or alarm may be indicated by a mark or symbol 421, for example a flag or a bubble, shown in FIGS. 5 and 6. The mark or symbol 421 may further be color coded to indicate or convey additional information about the client account 420. Clicking on mark or symbol 421 can bring up a rebalancing alert pop-up to remind the user 201 that an out-of-balance condition is present for the client account 420. In one example, a red flag can indicate that, for a client account 420, the account's asset classification values are outside the tolerance range of the client asset allocation model or client model 424. For example, an asset category that has a model percentage of 20%, and a tolerance of 5% will generate an alert 507, and show a red flag 421, if it's value is less than 15% of the total value of the client account, or greater than 25% of the client account 420. If a user 201 enters the rebalancing screen 240 for this account, the red flag can change to a different color flag or mark, e.g., blue. A blue flag can be used to indicate that client account 420 is out-of-balance but that the client account 420 has been viewed by an advisor since the client account 420 went out-of-balance. Once the out-of-balance account has been rebalanced, the Alert flag will can be removed.

The All Accounts screen 500 and 600 can also display: a Client short name column 508 that can show the client name assigned to a particular client account 520; an Account number column trigger or hyperlink 509 that can show the client account number. The account number 509 can be a hyperlink choice between a rebalancing screen 1100, shown in FIG. 11, and a model update screen 700, shown in FIG. 7; an assigned client account 520 Household Group ID 510; a Model name column 511 which can show the name of a particular client asset allocation model 424 associated with a client account 520; a Date Last Viewed column 512 which can shown the last date the account was viewed by a user 201 on the rebalancing screen 1100; and a Market value column 513 that can shown the current market value of a client account 520. Also, there can be provided a series of arrow triggers 531 that when clicked can order the client accounts 520 by the column corresponding to the clicked arrow 531 and can reverse the order by re-clicking the arrow 531. For example, clicking on the arrow 507A below the Alert header 507 can order all the client accounts 520 in the Alerts/Alarm column 507 in a selected order, e.g., red alerts, blue alerts, and no alerts.

The All Accounts screen 500 and 600 can also have a Cash superclass column indicator 504 which can be displayed in an expanded form or in a collapsed form, as shown in FIGS. 5 and 6, by clicking on the "Cash" button 504A. The Cash superclass column 504 can gather the columns 504B it spans to indicate that they are all of the superclass cash category. The "Cash" superclass category can include a Total cash column display and trigger 514 that can show the percentage as determined by the percentage parameter selection of the "Display by" drop down 501.

The All Accounts screen 500 and 600 can display a Stock or Equity superclass column indicator 506 which can be displayed in an expanded form or in a collapsed form, as shown in FIGS. 5 and 6, by clicking on the "Fixed" or "Equity" button 506A. The Stock or Equity superclass column 506 can gather the columns 506B it spans to indicate that they are all of the superclass stock or equity category. The "Stock" or "Equity" superclass category can include a Total Stock column display and trigger 521 that can show the percentage as determined by the percentage parameter selection of the "Display by" drop down 501.

The All Accounts screen 500 and 600 can also display a Fixed or Fixed Income superclass column indicator 505 which can be displayed in an expanded form, as shown in FIG. 5, or in a collapsed form, as shown in FIG. 6, by clicking on the "Fixed" button 505A. The Fixed Income superclass column can gather the columns 505B it spans to indicate that they are all of the superclass fixed income category. The expanded "Fixed Income" superclass category can include: a Total Fixed Income column and trigger 515; a Short Term fixed income column and trigger 516; a Long/Intermediate Term fixed income column and trigger 517; a Hi Yield fixed income column and trigger 518; an International fixed income column and trigger 519; an Other Bond fixed income column and trigger 520. These columns 515, 516, 517, 518, 519 and 520 in the "Fixed Income" superclass category can show percentages as determined by the percentage parameter selection of the "Display by" drop down menu 501

Those of skill in the art will readily recognize that different or additional client account information for the client accounts 520 may be included and displayed in the All Accounts screen 500 and 600. For example, referring to FIG. 6, there may be included links that the user 201 may click on to access various pages or screens in the rebalancing tool or application 63. The All Accounts screen 600 could further include a Reporting link 628 to create client reports, an Modify Model link 635, Rebalance Account link 640, Model History link 645 among others.

Account Rebalance/Rebalancing Screen

Returning to the application flow of FIGS. 2 and 3. From the default page 225, the user 201 could instead proceed to the Account Rebalance page 240. FIG. 2 also shows that the user 201 could also proceed directly to the Account Rebalance page 240 from the All Accounts page 230, e.g., by clicking on the Rebalance Account link 640, shown in FIG. 6. In the example shown in FIG. 3, the user can proceed to the Account Rebalance page 240.

Figure 12:
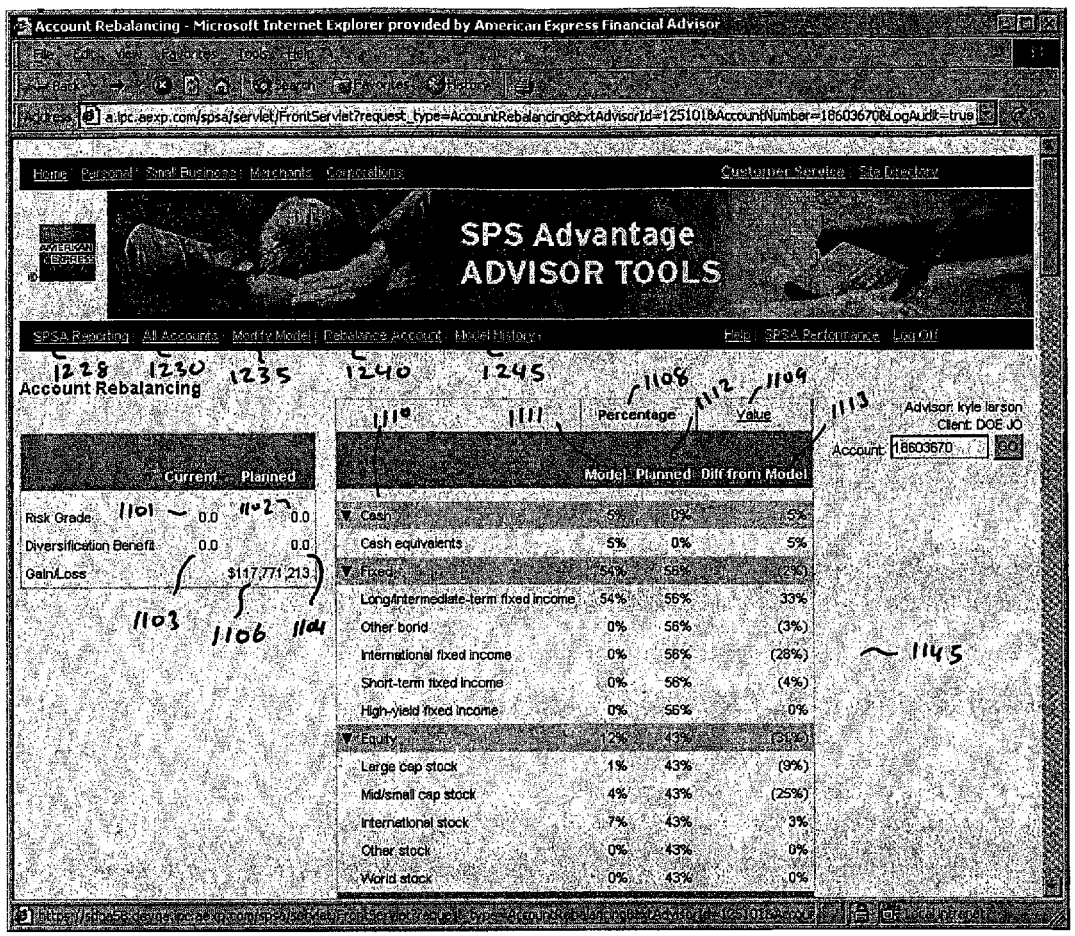
FIG. 12 illustrates a top section of another example of a client account rebalancing screen.
Figure 13:
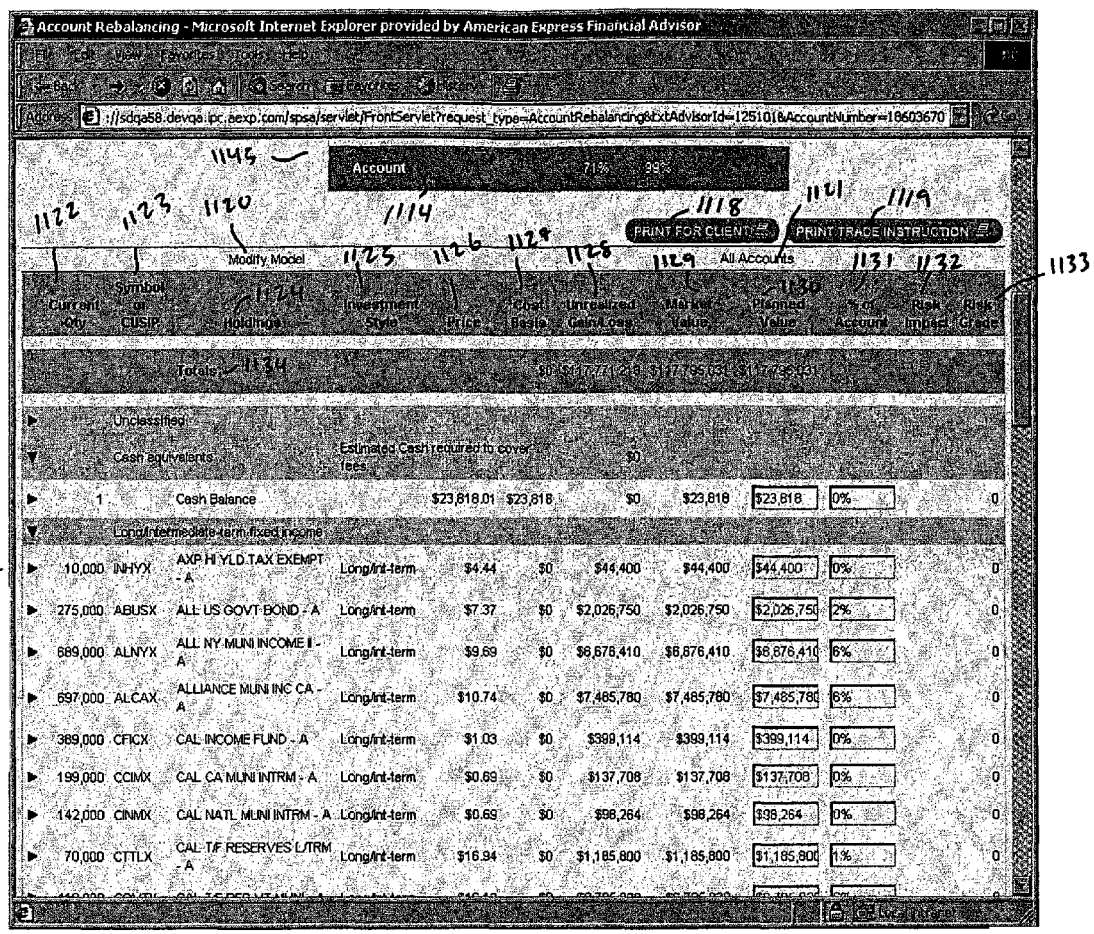
FIG. 13 illustrates a bottom section of the client account rebalancing screen of FIG. 12.

Upon proceeding to the Account Rebalance page 240, the user 201 can be presented with an Account Rebalance display screen 1100, 1200 or 1300, shown in FIGS. 11, 12 and 13. The Account Rebalance page 240 can enable the advisor 201 to carryout rebalancing hypothethicals of proposed trades and modifications to the client account 520, e.g., hypothetical buys and sells of client account positions. The Account Rebalance screen 1100, 1200 and 1300 can also show the impact of hypothetical trades entered by the advisor 201 to thereby permit the advisor 210 to analyze the results, e.g., risk grade, diversification benefit, and Gain/Loss. FIG. 11 illustrates one example of an account rebalancing screen 1100 that may be provided in the Account Rebalance page 240. FIGS. 12 and 13 illustrate top and lower portions 1200 and 1300 of an alternate example of the Account Rebalance screen 1100.

The Account Rebalancing screen 1100, 1200 and 1300 may display: a Current risk grade field 1101 showing the current risk grade of the client portfolio; a Planned riskgrade field 1102 showing the risk grade of the account portfolio, including planned or hypothetical trades; a Current diversification benefit field 1103 showing the current diversification benefit of the client portfolio; a Planned diversification benefit field 1104 showing the diversification of the client portfolio including the planned or hypothetical trades; a Planned gain/loss field 1105 showing the gain/loss benefit of the client portfolio including the planned or hypothetical trades; a To be Rebalanced field 1106 that can show the amount of funds to be rebalanced; and a Update risk & diversification trigger 1107 that when clicked can execute a rebalancing hypothetical which would refresh or update the Account Rebalancing screen 1100 including the Planned risk grade 1102, Diversification Benefit 1104 and Gain/loss 1105. The Update risk and diversification link or trigger 1107 may perform a substantially identical function as a Rebalance button 1140 listed below.

The Account Rebalancing screen 1100, 1200 and 1300 may also display: a Percentage trigger 1108 that when clicked can shown all values in a model/account summary table 45 as percentages; a Value trigger 1109 that when clicked can show all values in the model/account summary table 45 in dollar amounts; an Asset categories column display 1110 that can show each of the asset category descriptions; a Model value column 1111 that can show percentages or dollar amounts for each asset category in the model; a Planned value column display 1112 that can show percentages or dollar amounts for each asset category in the client account 520, including planned trades; a Difference from model column display 1113 that can show the difference in percentages or dollar amounts between the Model value column display 1111 and the Planned value column display 1112; a Current value column display 1144 that can show the current value in percentages or dollar amounts of the client account 520; and an Account total row display 1114 showing sum totals of each of the model value column 1111, planned value column 1112 and differences from model column 1113.

Figure 14:
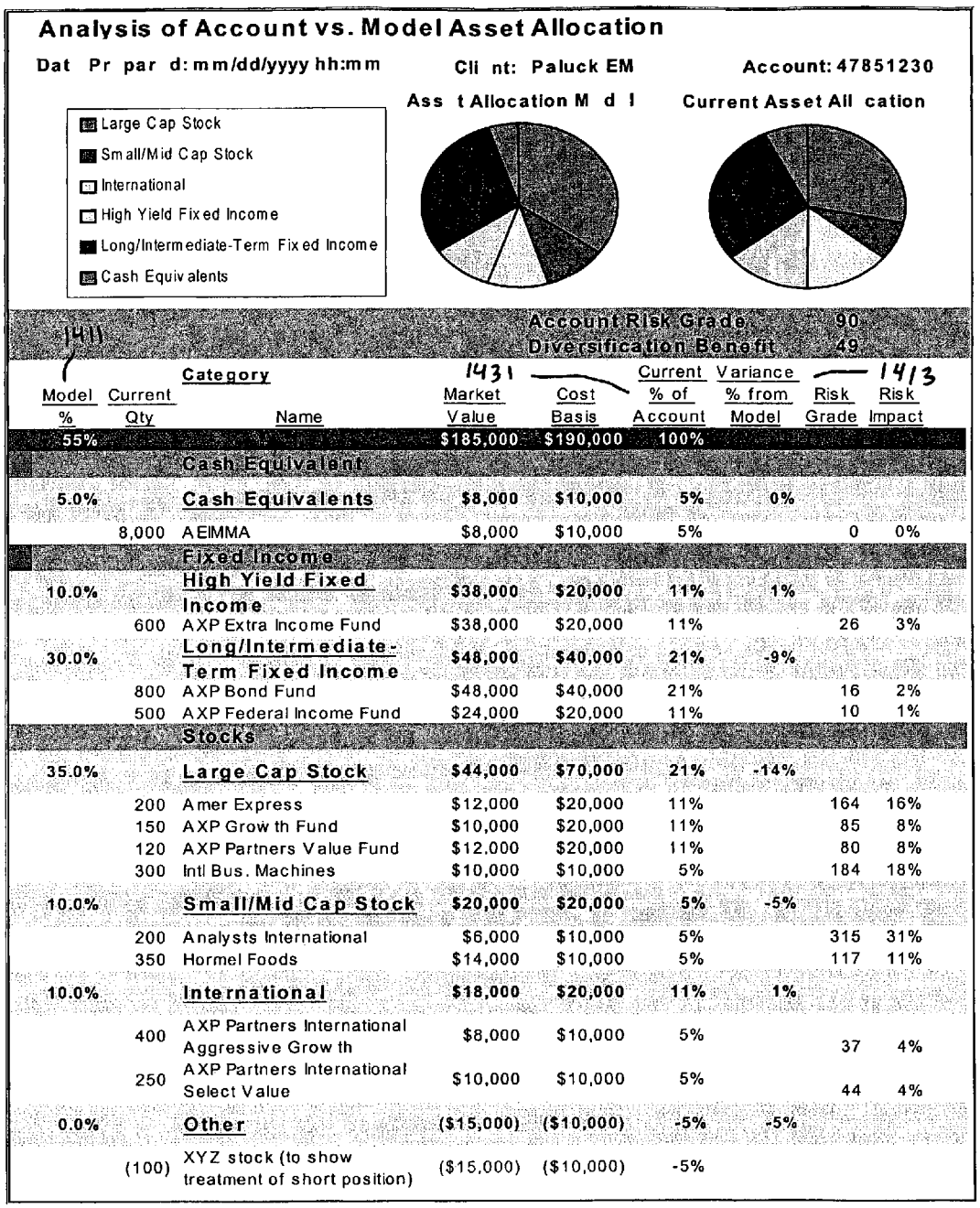
FIG. 14 illustrates an example of a client planned trade report.

The Account Rebalancing screen 1100, 1200 and 1300 may also display: a Client name field 1115 showing the name of the account owner; an Advisor name/number field display 1116 showing the name and number of the current advisor or user 201; and an Account number field display 1117 showing the account number of the current client account 520;

The Account Rebalancing screen 1100, 1200 and 1300 may display a "Print For Client" trigger or icon 1118 that when clicked can translate the current Account Rebalance screen 1100, which includes proposed trades, to a format for printing, e.g., PDF format, a plan trade report 250 (shown in FIGS. 2 and 3) for the client. The printed plan trade report 250 can include a client ready document that illustrates proposed trades intended to rebalance the client account 520 back to into balance with the original or updated client model 424. The advisor 201 can then share the printed plan trade report 250 with the client for client screening and approval. The plan trade report 250 may also show information relating to, among other information, current account holdings 1431, client asset allocation model parameters 1411 and variance of the account from the model 1413 so that a client could be informed about how out-of-balance the client account is, as shown in FIG. 14 in one example of a plan trade report 250.

The Account Rebalancing screen 1100, 1200 and 1300 may display a "Print Trade Instruction" trigger or icon 1119 that when clicked can translate the current saved planned trades to a format, e.g., a PDF format, for printing trade instructions or worksheet 255 (shown in FIGS. 2 and 3). In one example, the trade instructions or worksheet 255 can be a summary of a hypothetical trade or trades that the client can review and approve. The information content of the client approved trade instructions or worksheet 255 can then be inputted or submitted to an appropriate trading application or system to place and carry out the planned trades, e.g., the American Express® online brokerage trading system (OLB). Those of skill in the art will readily recognize that the rebalancing tool or application 63 may be, through appropriate programming instructions, modified to directly communicate with a computerized or online brokerage (OLB) trading system to place and carry out planned trades that have been screened and approved by the client. For example, the rebalancing application may include a button or trigger that can be clicked by the user 201 to submit the trade automatically after client review and approval.

The Account Rebalancing screen 1100, 1200 and 1300 may also include a Modify Model link or trigger 1120 that when clicked, can take the user 201 to a modify model screen 235, shown in FIG. 2, where the user may then modify or update a client asset model 424 corresponding to the current client account 520; an All Accounts link or trigger 1121 that can take the user 201 to the All Accounts page 230, where the user can have access to all client accounts 520 for the current advisor 201; a Current Quantity column 1122 showing the current quantity of a holding 1150 including planned trades; a Symbol or CUSIP designation column showing the symbol or CUSIP designation of the holding 1150; a Holdings column 1124 showing a description of the holding 1150; an Investment Style column or drop down 1125 showing the investment style of the holding. If no investment style is shown it can be selected; a Price column 1126 showing the current price of the holding 1150; an Add holding editable field 1142 that an advisor 201 can use to add a new symbol or security to the client account 520 to be rebalanced in a rebalancing hypothetical; and a Ticker/Symbol look up link or button 1143 that when clicked can link to an online brokerage trading system 260 (shown in FIGS. 2 and 3) to look up a symbol.

The Account Rebalancing screen 1100, 1200 and 1300 may also include a Cost basis display 1127 showing the original cost basis of the holding 1150; an Unrealized Gain/Loss column display 1128 that can show the difference between the cost basis 1127 of the holding 1150 and its current market value 1129, e.g., as the unrealized gain/loss=(quantity of the holding*price of the holding)−minus cost basis; a Market value column 1129 can show the current market value of the holding 1150 or asset class, e.g., as the current market value=quantity of holdings*price of holdings; a Totals row 1134 showing cost basis 1127, unrealized gain/loss 1128, market value 1129 and planned value 1130 totals across the client account 520 and which can be calculated as a sum of included columns across the client account; an asset class row display 1135 that can show the total market value of the holdings in each asset class and which can be calculated as a sum of included columns across the asset class; a Holding row display 1136 showing details at the CUSIP or symbol level; a Trade/tax lot row display 1137 that can show details of specific trades/tax lots; and an Asset Class selection drop down menu 1138 that enables the user 201 to select a classification of a stock that does not have an assigned classification or to specify an asset class for a planned holding when a standard or known classification is unavailable.

The Account Rebalancing screen 1100, 1200 and 1300 may also include a Planned value column editable field 1130. The planned value editable field 1130 can originally show the market value of the holding or stock 1150. The advisor 201 can change this value and click the rebalance button 1140 to create new planned trades. Values affected by planned trades can be shown in color, e.g., blue. This field can be updated immediately if the advisor changes the Percentage (%) of Account value field 1131. In one example, the planned value=quantity of holding*price of holding+value of planned trades.

The Account Rebalancing screen 1100, 1200 and 1300 may also include a Percentage (%) of Account column editable field 1131. The percentage (%) of account editable field 1131 can originally show the market value of the holding 1150 as a percentage of the client account 520. The advisor 201 can change this value and click the rebalance button 1140 to create new planned trades. Values affected by planned trades can be shown in color, e.g., blue. This field can be updated immediately if the advisor changes the Planned value editable field's 1130 value, such as changing the dollar amount value. In one example, the Percentage (%) of Account=quantity of holding*price of holding+value of planned trades as a percentage of the planned value of the entire client account.

The Account Rebalancing screen 1100, 1200 and 1300 may also include a Risk Impact column 1132 showing the risk of the holding 1150 as a percentage of risk across the whole account. The risk impact calculated as a percentage can show the weighting of risk in this particular holding, from percentage planned value and riskgrade 1133; a Risk Grade column 1133 showing the risk grade of the holding 1150; and a Reset/Clear button or trigger 1139 that when clicked can clear any planned trades that have not been saved or changed values in the rebalancing page 1100 but does not delete already previously saved planned trades.

The Account Rebalancing screen 1100, 1200 and 1300 can also include a Rebalance button or trigger 1140 that when clicked can recalculate or rebalance the client account based on new values or planned trades entered in the planned values fields 1130 and 1131 to carry out a rebalancing hypothetical. The Rebalance button 1140 can recalculate the entire rebalancing page 1100 based on values entered in editable fields 1130 and 1131. In one aspect, new planned values are stored by creating planned trades to adjust each holding to the new planned value; and a Save Planned Trades button or trigger 1141 that when clicked can store or save the hypothetical trades calculated by the rebalancing that resulted when the Rebalance button 1140 was clicked. The Save Planned Trades button can save hypothetical trades after the user is satisfied with the rebalancing results from a hypothetical trade.

Those of skill in the art will readily recognize that different or additional data and information content may be provided and displayed in the Rebalancing Screens 1100, 1200 and 1300. There may be included links that the user 201 may click on to access various other pages or screen in the rebalancing tool or application 63 as shown in FIGS. 2 and 3. The Rebalancing Screen 1300 can further include, among others, a Reporting link 1228 for client reporting, a Modify Model link 1135, Rebalance Account link 1240, Model History link 1245, etc., as shown in FIG. 12.

Model Creation/Update Screen

Returning now to the application flow of FIGS. 2 and 3, from the All Accounts page 230 or from the Account Rebalance/Rebalancing page 240, both discussed above, the user 201 can proceed to a Model Creation/Update page 235, e.g., by clicking on the Modify Model Link 635, 1120 and 1235, shown in FIGS. 6, 11 and 12.

Figure 7:
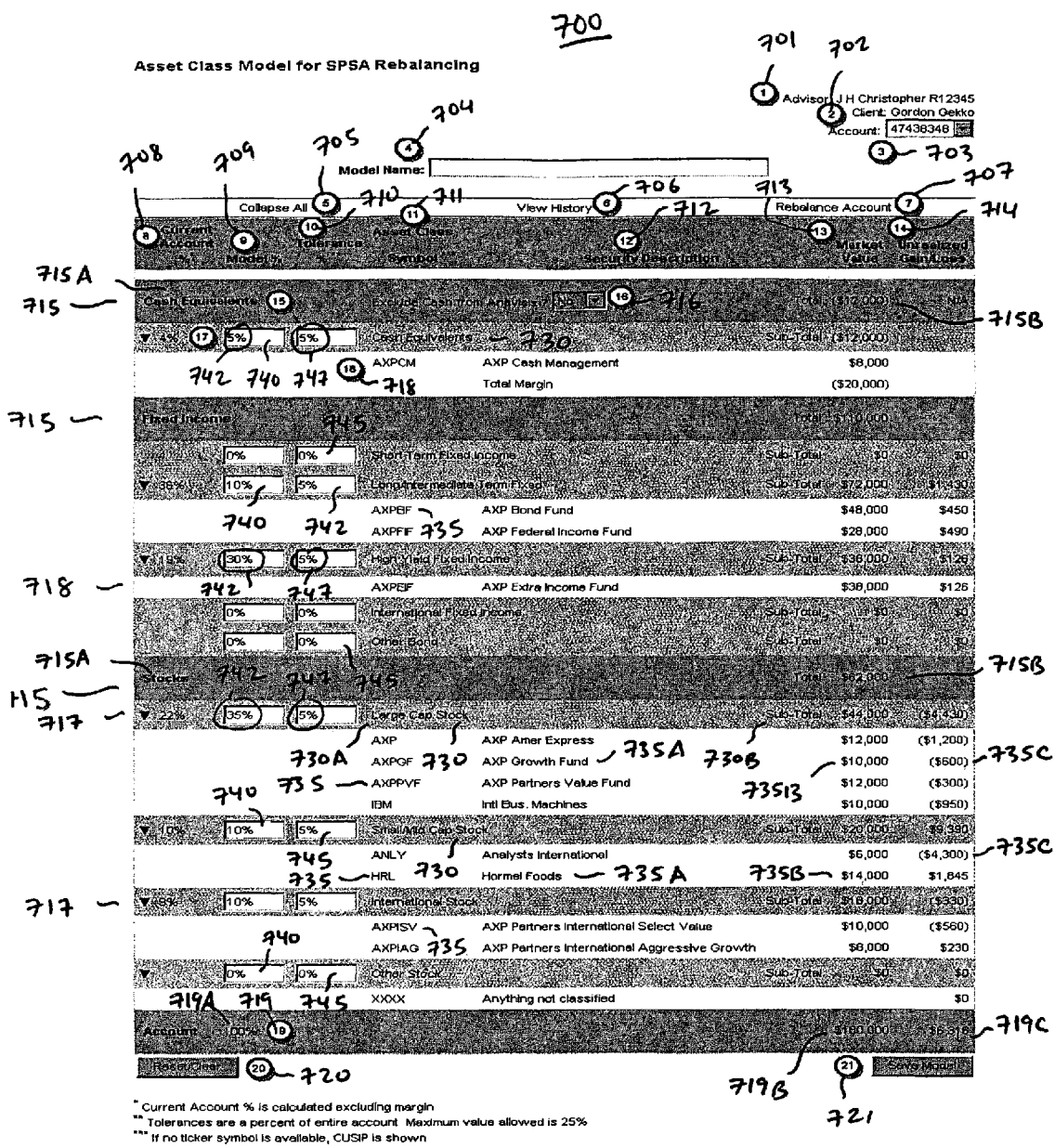
FIG. 7 illustrates an example of an asset allocation model create/update screen.
Figure 8:
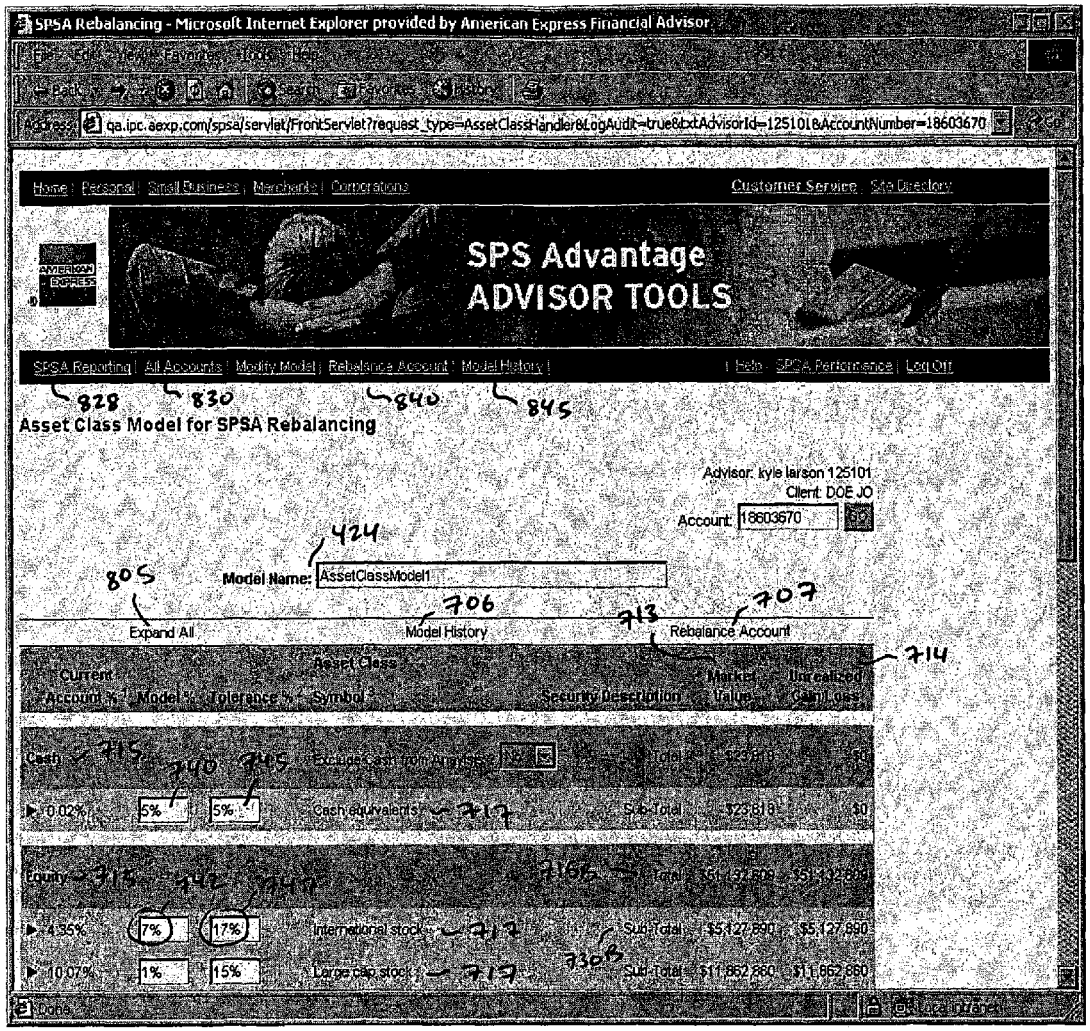
FIG. 8 illustrates another example of an asset allocation model create/update screen.

If the user 201 proceed to the Model Creation/Update page 240, the user can be presented with Model Creation/Update display screen 700 or 800 shown in FIGS. 7 and 8. A client asset allocation model 700 can be created after discussions between a financial advisor and a client regarding a client's financial situation, a client's investment goals and strategy, specific asset allocation parameters desired by the client, etc. The advisor can then develop a client investor profile that can be used in creating parameters for an asset allocation model or multiple client models if a client owns more than one client account 520 with the advisor. Asset allocation values or parameters for the client asset allocation model can be calculated in, a dedicated asset modeling application 62 which can calculate optimum model asset allocation values based on information entered by the advisor. The calculated asset allocation values or parameters can then be input into the Model Create/Update screen 700 by the advisor 201 to create an initial or original client asset allocation model 424. In one embodiment, the asset modeling application 62 is separate from the rebalancing application 63. Alternatively, the asset modeling application may be part of the rebalancing application 63 such that the calculated asset allocation parameters could be automatically calculated and included in the Model Create/Update screen 700 to facilitate the creation of a client model 424.

The Model Creation/Update screen 700 or 800 can comprise information and content relating to a client account 520 and enables the advisor 201 to create new client asset allocation model or modify and update an existing client asset allocation model 424 for a particular client account 520. The client asset allocation model, which can be designated with a particular client model name 424, preferably serves as a comparison basis or benchmark against which the client account 520 will be compared to determine whether the client account 520 is out-of-balance and thus whether an out-of-balance alarm or alert 420 should be generated. In one embodiment, the advisor will enter or update the values of the client asset allocation model percentages 709 and the client model tolerance percentages 710 in the Model Creation/Update screen 700 or 800. FIG. 7 illustrates one example of a Model Creation/Update screen 700 that may be provided in the Model Creation/Update page 235. FIG. 8 illustrates an alternate example of the Model Creation/Update screen 800 that may be provided in the Model Creation/Update page 235.

The Model Creation/Update screen 700 and 800 may display: an advisor name and number field 801 showing the particular advisor name and advisor number that any out-of-balance alerts would apply to; a client name field 802 showing the name of the client or account owner; an account number field or pull down menu 803 that can display the account number of the alerting account; and a model name field 804 where the mode name 424 of the client asset allocation model 424 to be applied to the client account 803 can be entered. If the model name field 804 is updated or changed, the new asset allocation model name 424 can be saved when "Save Model" button 821 is pressed by the user 201.

The Model Creation/Update screen 700 and 800 may include a "Collapse All" trigger 705 that can collapse the Model Creation/Update screen 700 into asset class totals when clicked on by the user, for example as shown in FIG. 8. When the Collapse All link 705 is clicked, the collapsed screen display 800 may show only rolled-up totals of asset classes and super classes which are calculated by the rebalancing application 63, as shown in FIG. 8. Clicking the "Expand All" link 805 can expand the asset allocation model screen display back to the client model shown in FIG. 7. Toggling between the collapsed 800 and expanded 700 asset allocation model screens can be occur by repeatedly clicking the "Collapse All" link and 705 and "Expand All" link 805.

Figure 9:
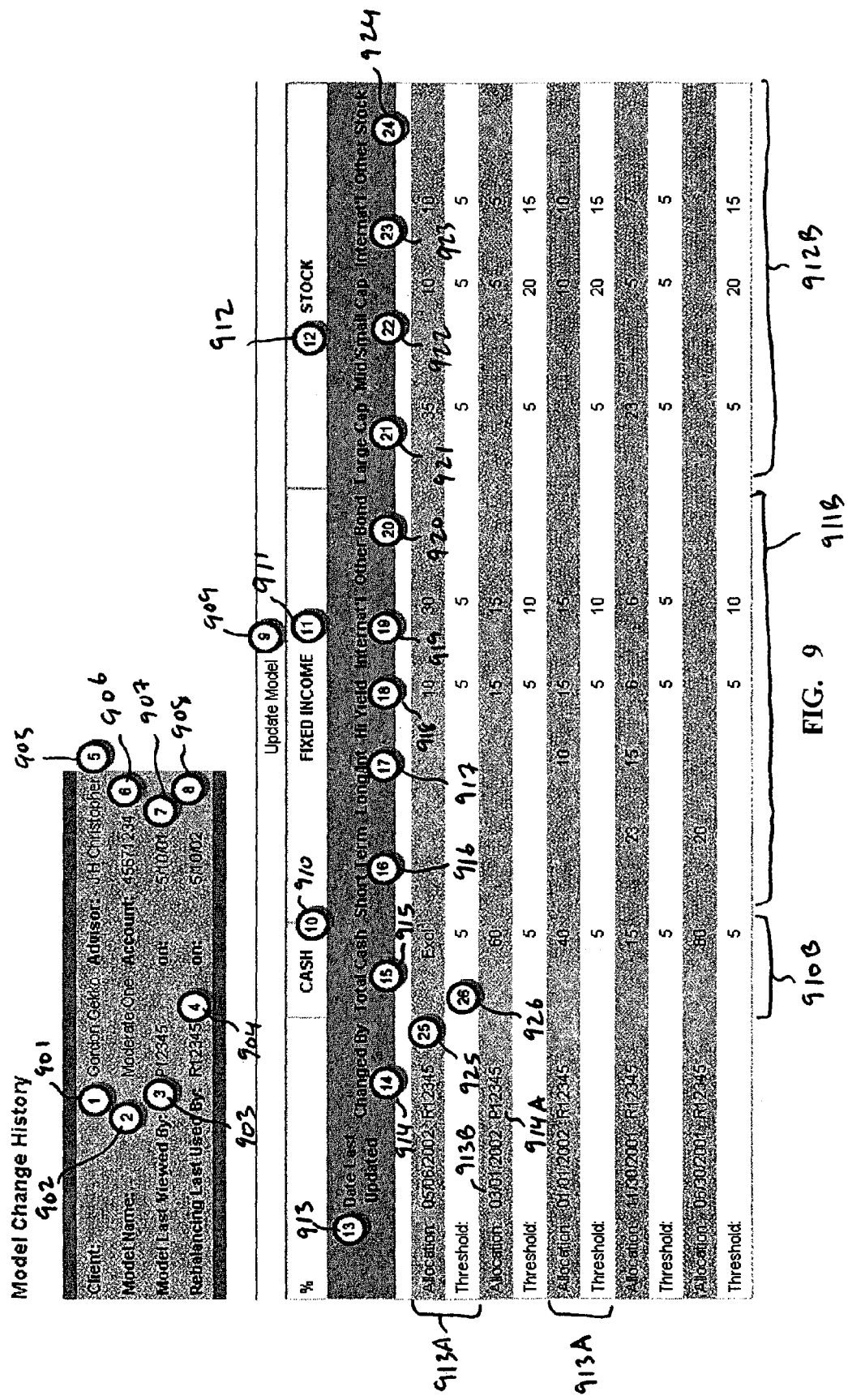
FIG. 9 illustrates a model history screen.
Figure 10:
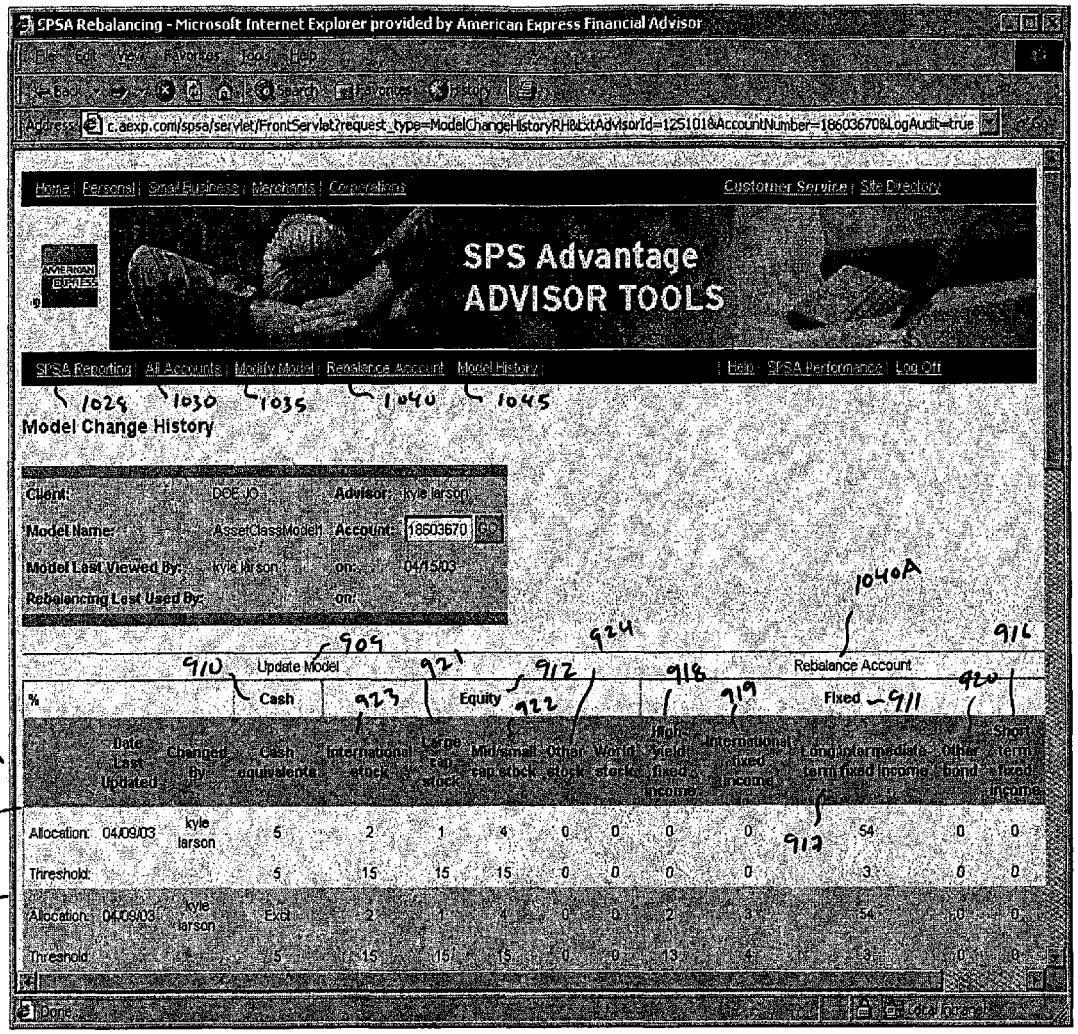
FIG. 10 illustrates another example of a model history screen.

The client asset allocation model 700 can include a "View History" link or trigger 706 that, when clicked, can take the user to a model history screen display 900 and 1000 showing any previous changes or history to the client asset allocation model, as shown in FIGS. 9 and 10. The "View History" link or trigger 906 could also be labeled "Model History" as show in the screen display for the collapsed asset allocation model 800 as shown in FIG. 8. The client asset allocation model 700 can also include a "Rebalance Account" link 707 that, when clicked, can take the user to a rebalancing screen display or page 1100, 1200, 1300, shown in FIGS. 11-13, that can allow the advisor or authorized user to rebalance the client account.

The Model Creation/Update screen 700 and 800 may have a super class category row 715 that displays the super class category description 715A and total market value 715B for that super class categories. In one aspect, the super class categories can include among others, cash or cash equivalents, fixed income, stocks and equity. Also, the "Cash Equivalents" super class category may included a drop-down cash exclusion indicator 716 that allows selection of whether cash should be excluded from the client model 424. The user can make and save the selection via the drop-down menu and clicking on a "Save Model" button 721. In some instances, if there is a margin balance present, the cash exclusion indicator 716 should be set to "no" and not updateable.

The Model Creation/Update screen 700 and 800 may also have an asset class or classification row 717 that displays percentage model asset allocation 740, percentage tolerance 745, asset class description 730A, and sub-totals 730B at the asset class level 730. In one aspect, the asset class level 730 can include, among others, classification or categories such as cash equivalents, short term fixed income, long/intermediate term fixed, high yield fixed income, international fixed income, other bond, large cap stock, small/midcap stock, international stock, other stock, etc. The Model Creation/Update screen 700 and 800 can have an instrument row 718 that displays the ticker symbol 735, symbol description 735A, market value 735B and unrealized gain/loss 735C at the instrument level 735.

The Model Creation/Update screen 700 and 800 may have a current account percentage column 708 showing the percentage (%) of the client account 520 currently in a specific asset class 730 and preferably appears in an asset class row 717. The current account percentage can be calculated excluding margin. In one example, the asset class percentage is calculated using asset classification information 730, positions quantity from a 1122, and securities price 1126.

The Model Creation/Update screen 700 and 800 can have a model percentage column 709 showing an editable model percentage field 740 on the asset class row 817 that can show the model selected percentage allocation 742 for each asset classification 730 for the client model 424. When the client asset model 424 is originally created, the advisor can input model calculated or selected percentage allocation 742 per asset class 730 for the client account 520 which is saved to a database 65 and subsequently accessed for inclusion in display screens or pages such as the Model Creation/Update screen 700 and 800 shown in FIGS. 7 and 8.

The Model Creation/Update screen 700 and 800 can have a tolerance percentage column 710 showing an editable tolerance percentage field 745 on the asset class row 717 that can show the model percentage tolerance or variance threshold 747 for each asset classification 730 for the client model 520. When the client asset model 424 is initially created, the advisor 201 inputs the desired tolerance percentage per asset class 747 in the client model 424 which is saved to a rebalancing application database 65 and subsequently accessed for inclusion in display screens or pages such as the Model Creation/Update screen 700 and 800 shown in FIGS. 7 and 8.

In one example, the tolerance percentage per asset class 747 is the amount of variance that is allowed above and below the percentage asset allocation 742 listed in the model percentage column 809. Thus, the tolerance percentage per asset class 747 can be viewed as a plus or minus tolerance percentage, ±X %. For example, if for an asset class 730, the model percent allocation 742 is 10% and the variance 747 is 5%, then the actual percent allocation can take on values in the range of between 5% and 15%. Values outside of this range will result in an out-of-balance condition and an alarm or alert 421 will be generated for that client's account or portfolio 420. In one aspect, the tolerance percentage threshold 747 for an asset class 730 is a percent of the entire client account or portfolio 520 and can have a range of between 0% and 25%.

The Model Creation/Update screen 700 and 800 may also have: an asset class or ticker symbol description column 711 which can shows the description of the asset classification on each asset class row 717 and/or the ticker symbol on each instrument row 718. If no ticker symbol is available, a CUSIP designation may instead be displayed; and a security or position description display 712 that shows the full description of the instrument, security or position 735 on the instrument rows 718.

The Model Creation/Update screen 700 and 800 may have can include a market value column 713 that shows the market value, e.g., in U.S. Dollars, on a super-class row 715, the asset class rows 717, and the instrument rows 718. Negative market value amounts may be shown in a different color, e.g., red, from the positive market value amounts and may be bracketed, e.g., by parenthesis brackets. The Model Creation/Update screen 700 and 800 may have an unrealized gain/loss column 714 that can show the unrealized gain or loss at the individual holding or instrument level 718 and appears in the asset class level rows 717. In one example, the unrealized gain or loss of a holding or instrument is the difference between the cost basis and the market value of the instrument. The Model Creation/Update screen 700 and 800 can also have a model total row 719 that shows the total or aggregate percentage 719A of the model percentage asset allocations 709 at the asset class level 730, the market value 7198 and the total unrealized gain/loss 719C for the client account or portfolio 520. In one example, aggregating each model percentage asset allocation 742 at the asset class level 730 will yield a total percentage allocation 719A of 100% for the client asset allocation model 520. However, the total percentage allocation quantities 719A can be more or less than 100% if desired by the advisor or client.

The Model Creation/Update screen 700 and 800 can have a Reset/Clear button 720 that when clicked can reset all model asset allocation and tolerance percentages 742 and 747 to their previously saved values. In the case of an original or new client model entry 740 and 745, all values may be zero or other default values. The Model Creation/Update screen 700 and 800 can have a Save Model button 721 which can commit and save model asset allocation and tolerance percentages 742 and 747, model name 704 and cash exclusion indicator 716 and add a particular model record or version 913A to the Model History screen page 900 and 1000, shown in FIGS. 9 and 10. In the case of a new client model 424 for a new client account 520 being entered into the rebalancing tool or application 63, for monitoring and future rebalancing, the new or initial client asset allocation model 424 for the client account 520, after being created is saved by clicking the "Save Model" button 721.

Those of skill in the art will readily recognize that different or additional data and information content may be provided and displayed in the Model Creation/Update screens 700 and 800. There may be included links that the user 201 may click on to access various other pages or screen in the rebalancing tool or application 63 as shown in FIG. 3. The Model Creation/Update screen 800 could further include, among others, a Reporting link for client reporting 828, an All Accounts link 830, Rebalance Account link 840, Model History link 845, etc., as shown in FIG. 8.

Model History Updates Screen

Returning now to the application flow of FIGS. 2 and 3. From the Model Creation/Update page 235 or the Account Rebalance/Rebalancing page 240, discussed above, the user 201 can proceed to a Model History Update page 245, e.g., by clicking on a Model History Link 706, 845 and 1245, as shown in FIGS. 7, 8 and 12.

If the user 201 proceed to the Model History Update page 245, the user 201 can be provided with a Model History Update display screen 900 and 1000, shown in FIGS. 9 and 10. The Model History Update page 245 can comprise history information and content relating to the creation and maintenance, i.e., modification and updating, of a client asset allocation model 424 for a client account 520. The history information and content enables a user 201 to quickly view previous settings of a particular client model 902 at various points in tine 913B. FIG. 9 illustrates one example of a Model History Update screen 900 that may be provided in the Model History Updates page 235. FIG. 10 illustrates another example of the Model History Update screen 1000 that may be provided in the Model History Updates page 235.

The Model History Updates screen 900 and 1000 may display: a Client name field 901 showing the name of the client account owner; a Model Name or client model name 902 showing the name of the current client model. In one example, the client model name 902 can be chosen by the advisor 201 and may be limited to a certain number of characters, e.g., thirty characters. Further, the client model may be left without a name; a Model Last Viewed By field 903 showing the user number of the advisor or user 201 that last accessed the client account 520 or Model Creation/Update screen 700 and 800; a Rebalancing Last Used By field 904 showing the advisor number of the advisor 201 that last used rebalancing on the client account 520 or that clicked the "Rebalance" button 1140 on the Account Rebalance screen 1100; an Advisor name display 905 showing the current advisor or user 201; an Account number display 906 showing the current account number of the accessed client account 520; a Model Last Viewed On field 907 showing the date that the model was last viewed; a Rebalancing Last Used On field 908 showing the last date that rebalancing was last used by clicking the "Rebalance" button 1140 on the Account Rebalance screen 1100; and an Update Model link or trigger 909 that when clicked can take the advisor to the Model Creation/Update page 235.

The Model History Updates screen 900 and 1000 may also display a Date Last Updated column 913 showing one or more dates 913B on which a particular version 913A of the client model name 902 was created, changed or re-saved in the rebalancing application 63. In one example, the version 913A of the client model name 902 that is displayed on the Model History screen 900 or 1000 comprises a Model asset class allocation percentages row 925 and a Model asset class tolerance percentages row 926. The Model asset class allocation percentages row 925 can show the model asset class allocation percentages 7740 that were created or modified and stored by the user 201 on a certain updating date 913B for the particular dated version 913A of the model name 902. The Model asset class tolerance percentages row display 926 can show the model asset class tolerance percentages 745 that were created or modified and stored by advisor 201 on the updating date 913B for the particular dated version 913A of the model name 902. The Model History Updates screen 900 and 1000 may also display a Changed By column 914 that can show the number 914A, e.g., advisor number or employee number, of the advisor 201 that made and committed the changes in the rebalancing application 63, e.g., by clicking the "Save Model" button 721 on the Model Creation/Update page 235 screen 700 on the updating date 913B.

The Model History Updates screen 900 and 1000 can display a Cash superclass column indicator and heading 910 that can gather any columns 910B that it spans to indicate that they are of the Cash superclass category. In one embodiment, the Cash superclass category can include a model Total Cash percentage column 915 that can show the model asset allocation percentage 740 of the cash asset class for the particular client model 902 on the date 913B of a particular version 913A of the particular model 902 and on alternate rows 926 can show the model tolerance percentage 745 for the cash asset class on the same date 913B.

The Model History Updates screen 900 and 1000 can display a Fixed Income superclass column indicator and heading 911 that can gather asset class columns 911B it spans to indicate that they are all of the superclass fixed income category. The Fixed Income asset class columns 911B can display the percentage allocation 740 in the Model asset class allocation percentages row 925 for a certain date 913B and corresponding version 913A of the displayed client model 902, and on an alternating Model asset class tolerance percentages row 926 can show the model tolerance percentage 745. In one embodiment, shown in FIGS. 9 and 10, the Fixed Income superclass column indicator 911 can include asset class columns 911B such as: a model Short Term fixed income percentage column 916; a model Long/Intermediate fixed income percentage column 917; a model High Yield fixed income percentage column 918; a model International fixed income percentage column 919; and a model Other Bond fixed income percentage column 920.

The Model History Updates screen 900 and 1000 can also display a Stock or Equity superclass column indicator and heading 912 that can gather the asset class columns 912B it spans to indicate that they are all of the superclass Stock or Equity category. The Stock or Equity asset class columns 912B can display the percentage allocation 740 in the Model asset class allocation percentages row 925 for a certain date 913B and corresponding version 913A of the displayed client model 902, and on an alternating Model asset class tolerance percentages row 926 can show the model tolerance percentage 745. In one embodiment, shown in FIGS. 9 and 10, the Stock or Equity superclass column indicator 912 can include asset class columns 912B such as: a model Large Cap stock percentage column 921; a model Mid/Small cap stock percentage column 922; a model International stock percentage column 923; and a model Other Stock percentage column 924.

Those of skill in the art will readily recognize that different or additional data and information content may be provided and displayed in the Model History Updates screen 900 and 1000. For example, referring to FIG. 10, there may be included links that a user 201 may click to access various other pages or screens in the rebalancing tool or application 63. The Model History Updates screen 1000 can also include, among others, a Reporting link 1028 for client reporting, an All Accounts link 1030, a Modify Model link 1035, Rebalance Account link 1040 and 1040A, etc.

Rebalancing Application Method

The rebalancing tool application 63 enables a user 201, e.g., a financial advisor, to monitor, analyze and assess current holdings in a client account or investment portfolio 520 against a selected client asset allocation model 424. The rebalancing tool 63 can automatically accesses client portfolio or account information from associated database storage applications, both internal 65 and 85 or external 35. The rebalancing tool 63 enables a financial advisor 201 to enter model percent asset allocation 740 and model percentage tolerances 745 by asset, class 730 to thereby permit the creation of a client asset allocation model 424 against which a designated account 520 will be monitored and compared against.

The rebalancing tool 63 preferably continuously monitors client accounts 520 to determine whether an out-of-balance condition exists and generates the alert or alarm to indicate that the alarmed client account 420 is out-of-balance with the client asset allocation model 424. The rebalancing tool permits the addition and deletion of CUSIP designated securities as part of the client account rebalancing. In response to generated out-of-balance alarms, the financial advisor can perform review the affected client account or accounts 420 and execute rebalancing hypotheticals. The financial advisor 201 can then present and discuss any recommendations, based on rebalancing hypothetical results and reports, to the client conveying whether any modifications should be made to the client account 520. Subsequent to client approval, modification of a client asset allocation model 424 or rebalancing of the client account 520 can be carried out per a client's authorization.

Figure 15:
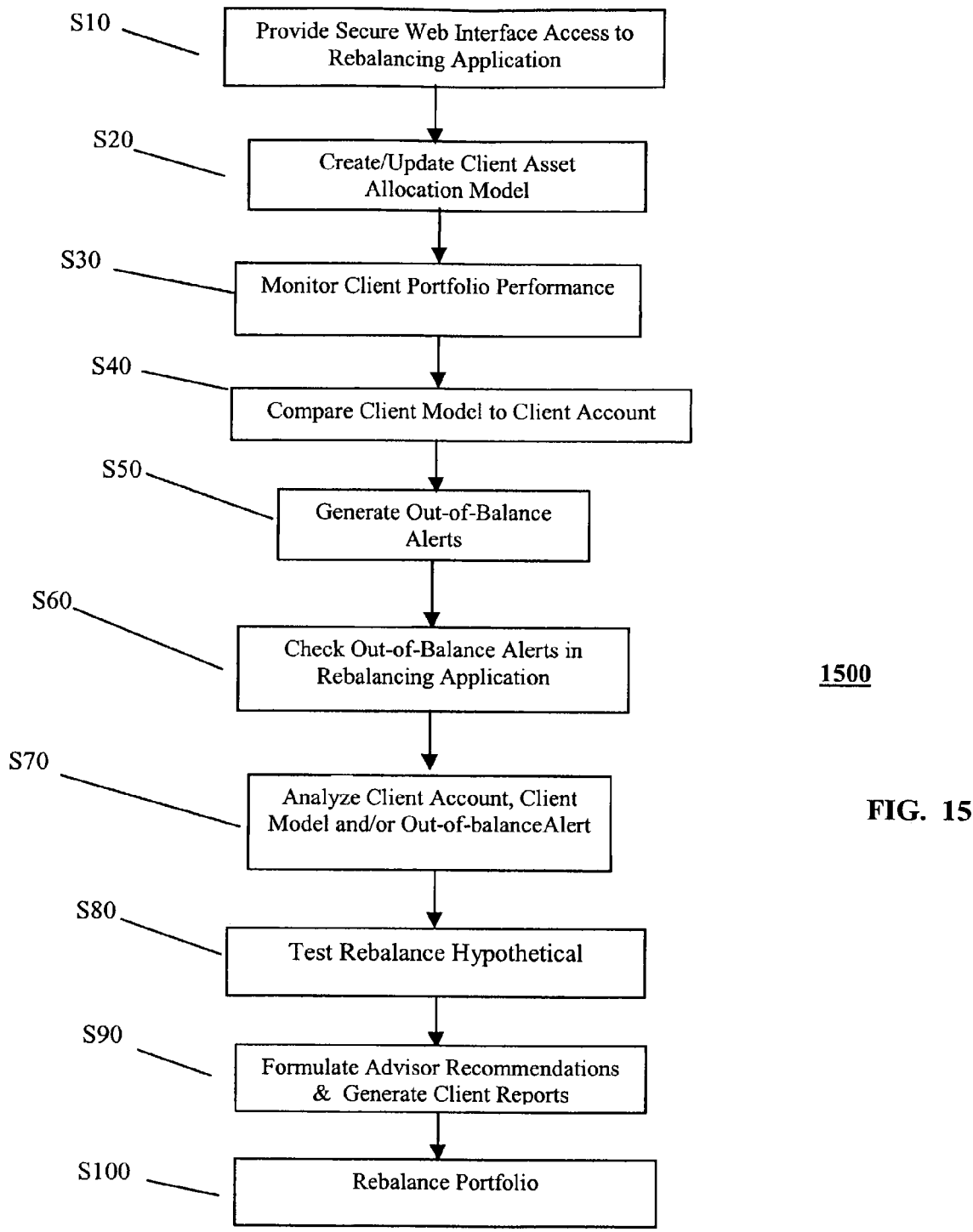
FIG. 15 illustrates steps that can be used to implement a rebalancing method.

FIG. 15 shows steps for one example of a method that can implement monitoring and rebalancing of a client account using the rebalancing application or tool 63. In Step S10, an authorized user securely accesses the rebalancing tool or application 63.

In Step S20, after securely accessing the rebalancing tool 63, the user navigates user interactive pages in the rebalancing tool 63 to arrive at a desired screen or page. If the user 201 is entering a new client account 520, then a new client asset allocation model 424 can initially be created and saved in the rebalancing application 63. The user 201 can create the new client model 424 by accessing the Model Create/Update screen 700 and 800, shown in FIGS. 7 and 8 and entering client model parameters such as model allocation percentages 740 and alarm threshold percentages 745 at the asset class level 730. Other client account 520 information and data can be automatically retrieved from associated applications and displayed on the Model Create/Update screen 700 and 800 by the rebalancing application 63. If the user 201 is accessing the rebalancing tool 63 to update or modify an exiting client asset allocation model for an existing client account 520, such changes can similarly be carried out in the Model Create/Update screen 700 and 800. The user 201 can also create new client asset allocation models 424 for existing client accounts 520. Once a client model 424 has been created or modified, the user may continue or log off the rebalancing application.

In Step S30, the rebalancing application or tool 63 monitors and tracks the performance of any new client accounts 520 and existing client accounts 520 previously entered in the rebalancing application. The rebalancing tool 63 can automatically retrieve necessary information and data related to the client account 520 from its own and external database applications and storage 65, 85 and 35 to carry out performance monitoring.

In Step S40, the rebalancing tool 63 compares relevant portions of each client account 520 against a designated or corresponding client asset allocation model 424. The comparisons can determine whether the current account percentages 708 at the asset class level 730 for a client account 520 are out-of-balance with the corresponding threshold value percentages 745 in the client asset allocation model 424. The comparison of a client account 520 against the client model 424 is preferably done at the asset class level 730. Those of skill in the art will readily recognize that comparisons may also be carried out at other class levels, e.g., the superclass level 715 or position level 718. Similar to the monitoring of client account performance, comparisons between the client accounts 520 and corresponding client model 424 are continuously carried out.

In Step S50, if the current account percentages 708 at the asset class level 730 are out-of-balance with the tolerance threshold value percentages 745, the rebalancing tool can generate out-of-balance alerts or alarms for a client accounts 520 to indicate that a client account 520 is out-of-balance with a corresponding client asset allocation model 424. The reblancing tool 63 can display out-of-balance client accounts 420 in an Out-of-Balance Alerts screen 400 or mark 421 out-of-balance client accounts 420 in an All Accounts screen 500 and 600.

In Step S60, the advisor accesses the rebalancing application 63 from time to time as deemed appropriate by the advisor or periodically, e.g., weekly, monthly, etc., to monitor or check the status of the client accounts 520 for which is responsible. The advisor can then see on the Out-of-Balance Alerts screen 400 or in the All Accounts screen 500 and 600 which client accounts 420 have alerts or alarms to indicate that they are out-of-balance.

In Step S70, the advisor may view and analyze one or more out-of-balance client accounts to determine why the alerts or alarms were generated. The review can be carried out by accessing one or more rebalancing screens such as the Account Rebalance screen 1100 and/or the Model Create/Update screen 700. After having reviewed the out-of-balance alerts and the affected client accounts 420, the advisor can exit the rebalance application 63 and return at a later time or date or continue to affect any modifications to the client account 520 and/or client asset allocation model 424.

In Step S80, the advisor can make modifications to a selected client account 520 and/or its client asset allocation model 424 to bring the out-of balance client account 420 back into balance with the client model 424. In one approach, the advisor can create and execute one or more rebalancing hypotheticals on the Account Rebalance screen 1100 to determine the best course of action to rebalance the client account 420. The rebalancing hypothetcials can include planned trades of existing client account holdings and/or acquisition of selected holdings, positions or CUSIP securities that can assist in rebalancing the client account 520. The proposed or planned trades or acquisitions are intended to affect the client account percentages 708 at the asset level 730 to thereby bring the client account 520 back within the tolerance threshold value percentages 745 in the asset allocation model 424.

Alternatively or additionally, rebalancing hypotheticals can include modification of the model percentage allocation 742 for one or more asset classification 730 in the client model 424, and/or the modification of the model tolerance threshold value percentages 745 for one or more asset classification 730 in the client model 424. The client model 424 modifications can be made in the Model Create/Update screen 700 and saved as a new version 913A of an existing client model or under a new model name 902. The new parameters can then be tested by running a rebalancing hypothetical in the Accounts Rebalance screen 1100.

The rebalancing tool 63 can generate various data and results that can allow an advisor to determine what are the best corrective actions to rebalance the our-of-balance client account 420 and what recommendation to present to a client about the client account 520. Data and results generated by executing rebalancing hypotheticals can include, among other information, risk factors in the proposed changes, tax implications and diversification factors of the proposed client account changes, as well as show the impact to the client portfolio of the rebalancing hypotheticals. For example, the rebalancing application 63 can determine the impact to Risk Grade, Diversification benefit, and Gain/loss for the rebalancing hypotheticals.

In Step S90, based on the results obtained and analyzed from conducting one or more rebalancing hypotheticals on a client account 520, the advisor can formulate recommendations and present to the client for discussion and authorization. The advisor may present his results, rebalancing hypotheticals, and recommendation in a plan trade report 250 and trade instructions worksheet (shown in FIGS. 2 and 3). The printed plan trade report 250 may comprise, among other information, rebalancing hypothetical results, current account holdings 1431, client asset allocation model parameters 1411 and variance of the client account 520 from the client model 1413, as shown in FIG. 14. The trade instructions worksheet 255 may be a summary of a proposed or hypothetical trade or trades. The plan trade report 250 and trade instructions worksheet 255 may also show how the proposed rebalance brings the client account or portfolio 520 back in line with the corresponding client asset allocation model 424.

The advisor and the user can discuss the client's financial situation and investment strategy and use the plan trade report 250 and trade instruction worksheet 255 to decide how to proceed. The advisor can discuss the out-of-balance alarms and rebalancing hypothetical results with the client to determine which actions may be best for the client based on the client's financial situation, investment objectives and investment risk tolerance level at that point in time. The client can then authorize or modify the advisors recommendations and rebalancing proposal to permit the advisor to make changes to rebalance the client account.

In Step S100, based on the client's authorization and instructions, an advisor can then make authorized changes to the client asset allocation model and/or input any approved trades to a trading system.

Certain preferred examples have been described and illustrated by way of example only. Those skilled in that art will recognize that the preferred examples may be altered or amended without departing from the inventive spirit and scope of the subject matter. Therefore, the subject matter is not limited to the specific details, representative devices, and illustrated examples in this description. The novel subject matter is limited only by the following claims and equivalents.

We claim:

1. A method of automated monitoring and rebalancing of client investment portfolios, the method comprising:
   operatively coupling a programmable processor to one or more databases;
   configuring, by the processor, access to a client representative based on a client representative authorization code, wherein the authorization code determines the rights provided to the client representative;
   retrieving, by the processor, for one or more clients, client portfolio data, market updates, one or more asset allocation models data, real time products data, and planned trades data, wherein the rights provided to the client representative based on the authorization code determine the amount of data that can be retrieved;
   comparing, by the processor, one or more asset class allocation percentages of one or more asset classes of the one or more client investment portfolios with one or more threshold value percentages of the one or more asset classes of the one or more asset allocation models of the one or more client investment portfolios;
   monitoring, by the processor, the one or more client investment portfolios for out of balance alerts, wherein generating the out of balance alerts when the one or more asset class allocation percentages of the one or more asset classes of the one or more client investment portfolios are out of balance with respect to the one or more threshold value percentages of the one or more asset classes of the one or more asset allocation models of the one or more client investment portfolios;
   generating, by the processor, one or more rebalancing hypotheticals, wherein the generating comprises,
      creating one or more asset allocation models based on the updated client investment portfolio data, evolved client goals data, real time market updates, and real time products data retrieved from the one or more databases,
      modifying the one or more asset class allocation percentages of the one or more asset classes of the one or more asset allocation models of the one or more client investment portfolios,
      modifying the one or more threshold value percentages of the one or more asset classes of the one or more asset allocation models of the one or more client investment portfolios,
      modifying the planned trades data of the one or more client investment portfolios based on the updated client investment portfolio data, evolved client goals data, market updates, real time products data, and planned trades data retrieved from the one or more databases, and
      executing the planned trades of the one or more client investment portfolios based on the updated client investment portfolio data, evolved client goals data, market updates, real time products data, and planned trades data retrieved from the one or more databases;
   executing, using the processor, the one or more rebalancing hypotheticals on the one or more client investment portfolios;
   generating a statement containing data relating to the impact of the execution of the one or more rebalancing hypotheticals on the one or more client investment portfolios; and
   if the one or more client investment portfolios are new, generating an asset allocation model based on the updated client investment portfolio data retrieved from the one or more databases.

2. The method of claim 1, wherein the comparing of the one or more client investment portfolios with the one or more asset allocation models comprises comparing at a super class or at an asset level.

3. The method of claim 1, wherein the rebalancing of the one or more client investment portfolios comprises implementing one or more rebalancing hypotheticals.

4. The method of claim 1, further comprising modifying the one or more asset allocation class percentages of the one or more asset allocation models of the one or more client investment portfolios based on the real time data received from the one or more databases, wherein the rebalancing of the one or more client investment portfolios comprises modifying one or more asset allocation models.

5. The method of claim 1, wherein the rebalancing of the one or more client investment portfolios comprises modifying one or more planned trades.

6. The method of claim 1, further comprising:
   if the one or more client investment portfolios are new, generating the one or more asset allocation models based on the updated client investment portfolio data retrieved from the one or more databases.

7. The method of claim 1, wherein color coded flags can be used as an indicator for out of balance one or more client investment portfolios.

8. The method of claim 1, wherein the impact of implementing hypothetical rebalances is made available to the client representative in the form of a report.

9. The method of claim 1, wherein the authorization code determines the rights provided to the client representative.

10. The method of claim 1, wherein the hypothetical rebalancing includes hypothetical buys and sells of securities, stocks, and equity.

11. The method of claim 1, wherein the one or more databases are connected via a network to the rebalancing application system.

12. A non-transitory computer-readable medium (CRM) having stored thereon a plurality of instructions, the plurality of instructions, when executed by a programmable processor, are configured to cause the processor to perform the method comprising:
   configuring, access to a client representative to a plurality of databases based on a client representative authorization code, wherein the authorization code determines the rights provided to the client representative;
   retrieving, for at least one of plurality of clients, client portfolio data, market updates, a plurality of asset allocation models data, real time products data, planned trades data, wherein the rights provided to the client representative based on the authorization code determine the amount of data that can be retrieved;
   comparing, at least one of a plurality of asset class allocation percentages of at least one of plurality of asset classes of the plurality of client investment portfolios with at least one of a plurality of threshold value percentages of at least one of the plurality of asset classes of a plurality of asset allocation models of the plurality of client investment portfolios;

monitoring, the plurality of client investment portfolios for out of balance alerts, wherein the out of balance alerts are generated in response to at least one of the plurality of asset class allocation percentages of at least one of the plurality of asset classes of the plurality of client investment portfolios being out of balance with respect to at least one of the plurality of threshold value percentages of at least one of the plurality of asset classes of the plurality of asset allocation models of the plurality of client investment portfolios;

generating, at least one of a plurality of rebalancing hypotheticals, wherein the generating comprises,
- creating at least one asset allocation model based on the updated client investment portfolio data, evolved client goals data, real time market updates, real time products data retrieved from the plurality of databases,
- modifying at least one asset class allocation percentage of the one or more asset classes of the plurality of client investment portfolios,
- modifying at least one threshold value percentage of the one or more asset classes of the plurality of asset allocation models of the plurality of client investment portfolios,
- modifying the planned trades data of at least one of the client investment portfolio based on the updated client investment portfolio data, evolved client goals data, market updates, real time products data, planned trades data retrieved from the plurality of databases, and
- executing at least one of the planned trades of the plurality of client investment portfolios based on the updated client investment portfolio data, evolved client goals data, market updates, real time products data, planned trades data retrieved from the plurality of databases;

executing, at least one rebalancing hypothetical on at least one of the plurality of client investment portfolios;

generating a statement containing data relating to the impact of the execution of the plurality of rebalancing hypotheticals on at least one of the client investment portfolios; and if at least one of the plurality of client investment portfolios are new, generating at least one asset allocation model based on the updated client investment portfolio data retrieved from the plurality of databases.

13. The CRM of claim 12, wherein the comparing of at least one of the plurality of client investment portfolios with at least one of the plurality of asset allocation models comprises comparing at a super class or at an asset level.

14. The CRM of claim 12, wherein the rebalancing of at least one of the plurality of client investment portfolios comprises implementing at least one of the rebalancing hypotheticals.

15. The CRM of claim 12, further comprising modifying at least one of the plurality of asset allocation class percentages of at least one of the plurality of asset classes of at least one of the plurality of asset allocation models of the plurality of client investment portfolios based on the real time data received from the plurality of databases, wherein the rebalancing of the plurality of client investment portfolios comprises modifying at least one of the plurality of asset allocation models.

16. The CRM of claim 12, wherein the rebalancing of at least one of the plurality of client investment portfolios comprises modifying at least one of the planned trades.

17. The CRM of claim 12, further comprising:
if at least one of the plurality of client investment portfolios are new, generating at least one asset allocation model based on the updated client investment portfolio data retrieved from the plurality of databases.

18. The CRM of claim 12, wherein color coded flags can be used as an indicator for out of balance client investment portfolios.

19. The CRM of claim 12, wherein the impact of implementing hypothetical rebalances is made available to the client representative in the form of a report.

20. The CRM of claim 12, wherein the authorization code determines the rights provided to the client representative.

21. The CRM of claim 12, wherein the hypothetical rebalancing includes hypothetical buys and sells of securities, stocks, and equity.

22. The CRM of claim 12, wherein the plurality of databases are connected via a network to the rebalancing application system.

* * * * *